(12) United States Patent
Gopinath et al.

(10) Patent No.: US 10,634,899 B2
(45) Date of Patent: Apr. 28, 2020

(54) OPTICAL IMAGING DEVICES AND VARIABLE-FOCUS LENS ELEMENTS, AND METHODS FOR USING THEM

(71) Applicant: The Regents of the University of Colorado, a body corporate, Denver, CO (US)

(72) Inventors: Juliet T. Gopinath, Boulder, CO (US); Emily A. Gibson, Boulder, CO (US); Victor M. Bright, Boulder, CO (US); Richard Weir, Longmont, CO (US); Diego Restrepo, Littleton, CO (US); Baris Ozbay, Denver, CO (US)

(73) Assignee: The Regents of the University of Colorado, A Body Corporate, Denver, CO (US)

(*) Notice: Subject to any disclaimer, the term of this patent is extended or adjusted under 35 U.S.C. 154(b) by 229 days.

(21) Appl. No.: 15/113,303

(22) PCT Filed: Jan. 22, 2015

(86) PCT No.: PCT/US2015/012539
§ 371 (c)(1),
(2) Date: Jul. 21, 2016

(87) PCT Pub. No.: WO2015/112770
PCT Pub. Date: Jul. 30, 2015

(65) Prior Publication Data
US 2017/0010456 A1    Jan. 12, 2017

Related U.S. Application Data

(60) Provisional application No. 61/930,349, filed on Jan. 22, 2014.

(51) Int. Cl.
*A61B 1/04* (2006.01)
*A61B 1/06* (2006.01)
(Continued)

(52) U.S. Cl.
CPC ............. *G02B 23/243* (2013.01); *G02B 3/14* (2013.01); *G02B 6/06* (2013.01); *G02B 21/006* (2013.01);
(Continued)

(58) Field of Classification Search
CPC .................................................... G02B 23/243
(Continued)

(56) References Cited

U.S. PATENT DOCUMENTS 8,315,282 B2 * 11/2012 Huber .................... H01S 3/1106
372/18
9,668,652 B2 * 6/2017 Vakoc ................ G01B 9/02091
(Continued)

FOREIGN PATENT DOCUMENTS

WO       2013144898 A2     10/2013

OTHER PUBLICATIONS

Van Howe et al. "Generation of 3.5 nJ femtosecond pulses from a continuous-wave laser without mode locking." Optics letters 32.11: 1408-1410. (Year: 2007).*
(Continued)

*Primary Examiner* — Fabio S Lima
(74) *Attorney, Agent, or Firm* — McDonnell Boehnen Hulbert & Berghoff LLP

(57) ABSTRACT

The present disclosure relates optical imaging devices and methods useful in biological and medical imaging applications. In one embodiment, an optical imaging device includes a flexible lightguide having a first end and a second end, the output of the source of pulsed infrared radiation being optically coupled to the first end of the flexible lightguide; a lens assembly attached to and optically coupled to the second end of the flexible lightguide, the lens assembly comprising a variable-focus lens element, the a variable-focus lens element having a tunable focal length; and a
(Continued)

photodetector coupled to the flexible lightguide to detect radiation propagating from the second end toward the first end of the flexible lightguide. The optical imaging devices and methods can be used in both confocal and multi-photon techniques.

19 Claims, 18 Drawing Sheets

(51) Int. Cl.
    *G02B 23/24*     (2006.01)
    *G02B 3/14*     (2006.01)
    *G02B 26/00*     (2006.01)
    *G02B 6/06*     (2006.01)
    *G02B 21/00*     (2006.01)
    *G02B 23/26*     (2006.01)
    *H04N 5/225*     (2006.01)

(52) U.S. Cl.
    CPC ..... *G02B 21/0032* (2013.01); *G02B 21/0076* (2013.01); *G02B 23/2446* (2013.01); *G02B 23/2469* (2013.01); *G02B 23/26* (2013.01); *G02B 26/005* (2013.01); *H04N 5/2256* (2013.01); *H04N 2005/2255* (2013.01)

(58) Field of Classification Search
    USPC .......................................................... 348/48
    See application file for complete search history.

(56) References Cited

U.S. PATENT DOCUMENTS

| | | | |
|---|---|---|---|
| 2008/0097143 A1* | 4/2008 | Califorrniaa | A01N 1/02 600/22 |
| 2009/0133170 A1* | 5/2009 | Rolland | G02B 26/105 850/56 |
| 2010/0141829 A1* | 6/2010 | Jalali | A61B 1/00009 348/370 |
| 2010/0277923 A1 | 11/2010 | Takai | |
| 2010/0302646 A1 | 12/2010 | Takai et al. | |
| 2011/0049337 A1* | 3/2011 | Taira | G01J 9/04 250/216 |
| 2011/0118610 A1* | 5/2011 | Kuiper | A61B 1/0019 600/476 |
| 2012/0013967 A1 | 1/2012 | Kim | |
| 2012/0143004 A1 | 6/2012 | Gupta et al. | |
| 2014/0253870 A1* | 9/2014 | Jiang | G02B 3/14 351/159.05 |
| 2015/0201902 A1* | 7/2015 | Zhu | A61B 8/12 600/443 |
| 2015/0238071 A1* | 8/2015 | Hua | A61B 1/07 600/109 |

OTHER PUBLICATIONS

B.H. Kolner, "Active pulse compression using an integrated electro-optic phase modulator," Appl. Phys. Lett. 52, 1122-24 (1988).
S. Kuiper et al., "Variable-focus liquid lens for miniature cameras," Appl. Phys. Lett. 85, 1128-30 (2004).
P.F. Garcia et al., "Gas diffusion ultrabarriers on polymer substrates using Al2O3 atomic layer deposition and SiN plasma-enhanced chemical vapor deposition," Journal of Applied Physics 106, 023533-106 (2009).
S. Berry et al., "Low voltage electrowetting using thin fluoroploymer films," J. Colloid and Interface Science, 303, 517-24 (2006).
M.D. Groner et al., "Electrical characterization of thin Al2O3 films grown by atomic layer deposition on silicon and various metal substrates," Thin Solid Films, 413, 186-97 (2002).
Y.-J. Chang et al., "Fabrication of tapered SU-8 structure and effect of sidewall angle for a variable focus microlens using EWOD," Sensors and Actuators A, 136, 546-553 (2007).
D.D. Cox, "Functional magnetic resonance imaging (fMRI) 'brain reading': detecting and classifying distributed patterns of fMRI activity in human visual cortex," Neroimage, 19, 261-70 (2003).
T. Weyrauch et al., "Performance evaluation of micromachined mirror arrays for adaptive optics," Proc. of SPIE, 4124, 32-41 (2000).
S.M. George, "Atomic Layer Deposition: An Overview," Chem. Rev., 110, 111-31 (2010).
J.Y. Chen et al., "Electrowetting in Carbon Nanotubes," Science, 310, 1480-84 (2005).
W. Lin et al., "Olfactory neurons expressing transient receptor potential channel M5 (TRPM5) are involved in sensing semiochemicals," PNAS, 104, 2471-76 (2007).
M. Wachowiak. et al., "Optical Dissection of Odor Information Processing In Vivo Using GCaMPs Expressed in Specified Cell Types of the Olfactory Bulb," J. Neuroscience, 33, 5285-5300 (2013).
J. Akerboom et al., "Optimization of a GCaMP Calcium Indicator for Neural Activity Imaging," J. Neuroscience, 32, 13819-40 (2012).
L. Ziph-Schatzberg et al, "Secure optical communication system utilizing deformable MEMS mirrors," Proc. SPIE, 7209, 72090C 1-15 (2009).
D.G. Mixon et al., "A thermal model of laser absorption," Proc. SPIE, 6435, 643506 1-4 (2007).
W.D. Cowan et al., "Surface Micromachined Segmented Mirrors for Adaptive Optics," IEEE J. Selected Topics in Quantum Elec., 5, 90-101 (1999).
Z. Jiang et al., "Optical Processing Based on Spectral Line-by-Line Pulse Shaping on a Phase-Modulated CW Laser," IEEE J. Quantum Elec., 42, 657-666 (2006).
N.R. Smith et al., "Fabrication and Demonstration of Electrowetting Liquid Lens Arrays," J. Display Tech., 5, 411-13 (2009).
A. I. Abdulagatov et al., "Al2O3 and TiO2 Atomic Layer Deposition on Copper for Water Corrosion Resistance," ACS Appl. Mater. Interfaces, 3, 4593-4601 (2011).
P.T.C. So et al., "Two-Photon Excitation Fluorescence Microscopy," Ann. Rev. Biomed. Eng., 2, 399-429 (2000).
G.H. Gold, "Controversial Issues in Vertebrate Olfactory Transduction," Ann. Rev. Physiol., 61, 857-71 (1999).
G.D. Love, "Wave-front correction and production of Zernike modes with a liquid-crystal spatial light modulator," Appl. Optics, 36, 1517-24 (1997).
D.-Y. Zhang et al., "High-performance fluidic adaptive lenses," Appl. Optics, 43, 783-787 (2004).
J.T. Gopinath et al., "Simulation of electrowetting lens and prism arrays for wavefront correction," Appl. Optics, 51, 6618-23 (2012).
R.D. Niederriter et al., "Measurement of the M2 beam propagation factor using a focus-tunable liquid lens," Appl. Optics, 52, 1591-98 (2013).
R.D. Niederriter et al., "Electrowetting lenses for compensating phase and curvature distortion in arrayed laser systems," Appl. Optics, 52, 3172-77 (2013).
A.J. Bower et al., "Correction of a Liquid Lens for 3D Imaging Systems," Proc. SPIE, 8429, 842909 1-7 (2012).
C.M. Brown et al., "In vivo imaging of unstained tissues using a compact and flexible multiphoton microendoscope," J. Biomed. Optics, 17, 040505 1-3 (2012).
J.-h. Chang et al., "Driving characteristics of the electrowetting-on-dielectric device using atomic-layer-deposited aluminum oxide as the dielectric," Microfluid Nanofluid, 8, 269-73 (2010).
M. Chen et al., "Endoscope lens with dual fields of view and resolutions for multiphoton imaging," Opt. Lett., 35, 2735-37 (2010).
S.-C. Chen et al., "Thermomechanical Actuator-Based Three-Axis Optical Scanner for High-Speed Two-Photon Endomicroscope Imaging," J. Microelectromech. Syst., 23, 570-78 (2014).
W. Denk et al., "Two-Photon Laser Scanning Fluorescence Microscopy," Science, 248, 73-77 (1990).
M. T. Myaing et al., "Fiber-optic scanning two-photon fluorescence endoscope," 31, 1076-78 (2006).
D.A. Dombeck et al., "Imaging Large-Scale Neural Activity with Cellular Resolution in Awake, Mobile Mice," Neuron, 56, 43-57 (2007).

(56) References Cited

OTHER PUBLICATIONS

B.A. Flusberg, "Fiber-optic fluorescence imaging," Nat. Methods, 2, 941-50 (2005).
B.A. Flusberg, "High-speed, miniaturized fluorescence microscopy in freely moving mice," Nat. Methods, 5, 935-38 (2008).
A.F. Gmitro, "Confocal microscopy through a fiber-optic imaging bundle," Optics Letts., 18, 565-567 (1993).
W. Göbel et al., "Miniaturized two-photon microscope based on a flexible coherent fiber bundle and a gradient-index lens objective," 21, 2521-23 (2004).
W. Göbel et al., "Imaging cellular network dynamics in three dimensions using fast 3D laser scanning," Nat. Methods, 4, 73-79 (2007).
B.F. Grewe et al., "Fast two-layer two-photon imaging of neuronal cell populations using an electrically tunable lens," Biomed. Optics Express, 2, 2035-46 (2011).
M. Gu et al., "Fibre-optical microendoscopy," J. Microscopy, 254(1), 13-18 (2014).
R. Le Harzic et al., "Nonlinear optical endoscope based on a compact two axes piezo scanner and a miniature objective lens," Optics Express, 16, 20588-96 (2008).
F. Helmchen et al., "A Miniature Head-Mounted Two-Photon Microscope: High-Resolution Brain Imaging in Freely Moving Animals," Neuron, 31, 903-12 (2001).
P. Theer et al., "On the fundamental imaging-depth limit in two-photon microscopy," J. Opt. Soc. Am. A, 23, 3139-3149 (2006).
C.F. Hermann et al., "Conformal hydrophobic coatings prepared using atomic layer deposition seed layers and non-chlorinated hydrophobic precursors," J. Micromechanics and Microengineering, 15, 984-92 (2005).
C.L. Hoy et al., "Miniaturized probe for femtosecond laser microsurgery and two-photon imaging," Optics Express, 16, 9996-10005 (2008).
R.P.J. Barretto et al., "In Vivo Optical Microendoscopy for Imaging Cells Lying Deep within Live Tissue," 2012, 1029-34 (2012).
A.N.H. Hodges et al., "Human lung density is not altered following normoxic and hypoxic moderate-intensity exercise: implications for transient edema," J. Appl. Physiol., 103, 111-118 (2007).
J. Riesert et al., "Response kinetics of olfactory receptor neurons and the implications in olfactory coding," J. Gen. Physiol., 138, 303-10 (2011).
European Pat. App. 15740974, Partial Search Report, dated Oct. 23, 2017.
European Pat. App. 15740974, Extended European Search Report and Search Opinion, dated Jan. 26, 2018.
W. Doucette et al., "Profound Context-Dependent Plasticity of Mitral Cell Responses in Olfactory Bulb," PLoS Biology, 6, 2266-85 (2008).
A.A. Dameron, "Gas Diffusion Barriers on Polymers Using Multilayers Fabricated by Al2O3 and Rapid SiO2 Atomic Layer Deposition," J. Phys. Chem. C, 112, 4573-80 (2008).
F. Krogmann et al., "A MEMS-based variable micro-lens system," J. Opt. A: Pure Appl. Opt., 8, S330-36 (2006).
L. Fu, "Fibre-optic nonlinear optical microscopy and endoscopy," Ph.D. Thesis, Centre for Micro-Photonics, Faculty of Engineering and Industrial Sciences, Swinburne University of Technology, Melbourne, Australia (2007).
A. Li et al., "Precise Detection of Direct Glomerular Input Duration by the Olfactory Bulb," J. Neurosci., 34, 16058-64 (2014).
F. Mugele et al., "Electrowetting: from basics to applications," J. Phys.: Condens. Matter, 17, R705-74 (2005).
F. Helmchen et al., "Deep tissue two-photon microscopy," Nat. Methods, 2, 932-940 (2005).
M. Smear et al., "Perception of sniff phase in mouse olfaction," Nature, 479, 397-400 (2011).
T.-W. Chen et al., "Ultrasensitive fluorescent proteins for imaging neuronal activity," Nature, 499, 295-300 (2013).
W.R. Zipfel et al., "Nonlinear magic: multiphoton microscopy in the biosciences," Nature Biotech., 21, 1369-77 (2003).
E.J. Siebel et al., "Scanning Single Fiber Endoscopy: A new platform technology for integrated laser imaging, diagnosis, and future therapies," Gastrointest. Endosc. Clin. N. Am., 18, 467-78 (2008).
T. Bozza et al., "Mapping of Class I and Class II Odorant Receptors to Glomerular Domains by Two Distinct Types of Olfactory Sensory Neurons in the Mouse," Neuron, 61, 220-33 (2009).
S.D. Munger et al., "An olfactory subsystem that detects carbon disulfide and mediates food-related social learning," Curr. Biol., 20, 1438-44 (2010).
P. Mombaerts, "Genes and Ligands for Odorant,Vomeronasal and Taste Receptors," Nat. Reviews, 5, 263-78 (2004).
H.A. Zariwala et al., "A Cre-dependent GCaMP3 reporter mouse for neuronal imaging in vivo," J. Neurosci., 32, 3131-41 (2012).
H.K. Kato et al., "Dynamic Sensory Representations in the Olfactory Bulb: Modulation by Wakefulness and Experience," Neuron, 76, 962-75 (2012).
J.A. Thompson et al., "Second Order Input to the Medial Amygdala From Olfactory Sensory Neurons Expressing the Transduction Channel TRPM5," J. Comp. Neurol., 520, 1819-30 (2012).
R. Shusterman et al., "Precise olfactory responses tile the sniff cycle," Nature Neurosci., 14, 1039-46 (2011).
A.P. Alivisatos et al., "Nanotools for Neuroscience and Brain Activity Mapping," ACS Nano, 7, 1850-66 (2013).
H. Ren et al., "Tunable-focus liquid lens controlled using a servo motor," Optics Express, 14, 8031-36 (2006).
C.J. Engelbrecht et al., "Ultra-compact fiber-optic two-photon microscope for functional fluorescence imaging in vivo," Optics Express, 16, 5556-64 (2008).
D.H. Broaddus et al., "Temporal-imaging system with simple externalclock triggering," Optics Express, 18, 14262-69 (2010).
S.-L. Lee et al., "Numerical simulation for meniscus shape and optical performance of a MEMS-based liquid micro-lens," Optics Express, 16, 19995-20007 (2008).
M.D. Fox et al., "Spontaneous fluctuations in brain activity observed with functional magnetic resonance imaging," Nature Reviews, Neuroscience, 8, 700-711 (2007).
K. Wang, "Synchronized time-lens source for coherent Raman scattering microscopy," Optics Express, 18, 24019-24 (2010).
J.C. Jung et al., "Multiphoton endoscopy," Optics Lett., 28, 902-04 (2003).
C. Warde et al., "Microchannel spatial light modulator," Optics Lett., 3, 196-198 (1978).
Y. Hongbin et al., "Optofluidic variable aperture," Optics Lett., 33, 548-550 (2008).
J. van Howe et al., "Generation of 3.5 nJ femtosecond pulses from a continuous-wave laser without mode locking," Optics Letts., 32, 1408-10 (2007).
B.A. Flusberg et al., "In vivo brain imaging using a portable 3.9 gram two-photon fluorescence microendoscope," Optics Lett., 30, 2272-74 (2005).
P. Theer et al., "Two-photon imaging to a depth of 1000 (micro)m in living brains by use of a Ti:Al2O3 regenerative amplifier," Optics Letts., 28, 1022-24 (2003).
W.W. Webb et al., "Minature varifocal objective lens for endomicroscopy," Optics Lett., 38, 3103-06 (2013).
D.H. Gire et al., "Temporal Processing in the Olfactory System: CanWe See a Smell?," Neuron, 78, 416-32 (2013).
H.-C. Park et al., "Lissajous fiber scanning for forward viewing optical endomicroscopy using asymmetric stiffness modulation," Optics Espress, 5818-25 (2014).
W. Doucette et al., "Associative Cortex Features in the First Olfactory Brain Relay Station," Neuron, 69, 1176-87 (2011).
K.M. Cury et al., "Robust Odor Coding via Inhalation-Coupled Transient Activity in the Mammalian Olfactory Bulb," Neuron, 68, 570-85 (2010).
D.D. Stettler et al., "Representations of Odor in the Piriform Cortex," Neuron, 63, 854-64 (2009).
D. Schild et al., "Transduction Mechanisms in Vertebrate Olfactory Receptor Cells," Physiol. Rev., 78, 429-66 (1998).
A. Perez-Alvarez et al., "Confocal microscopy for astrocyte in vivo imaging: recycle and reuse in microscopy," Frontiers in Cellular Neurosci., 7, 51 1-10 (2013).

(56) References Cited

OTHER PUBLICATIONS

Y. Zhao et al., "Development of a versatile two-photon endoscope for biological imaging," Biomed. Optics Express, 1, 1160-72 (2010).
D.R. Rivera et al., "Compact and flexible raster scanning multiphoton endoscope capable of imaging unstained tissue," PNAS, 108, 17598-603 (2011).
J.A. Udovich et al., "Spectral background and transmission characteristics of fiber optic imaging bundles," Appl. Optics, 47, 4560-69 (2008).
Y. Wu et al., "Scanning fiber-optic nonlinear endomicroscopy with miniature aspherical compound lens and multimode fiber collector," Optics Lett., 34, 953-55 (2009).
Y. Shao et al., "3-D MOEMS Mirror for Laser Beam Pointing and Focus Control," IEEE J. Selected Topics in Quantum Elecs., 10, 528-35 (2004).
A. Straub et al., "High speed multiphoton axial scanning through an optical fiber in a remotely scanned temporal focusing setup," Biomed. Optics Express, 2, 80-88 (2011).
D.R. Rivera et al., "Multifocal multiphoton endoscope," 37, 1349-51 (2012).
H.-J. Shin et al., "Fiber-optic confocal microscope using a MEMS scanner and miniature objective lens," Optics Express, 15, 9113-9122 (2007).
M.C. Roggemann et al., "Micro-electro-mechanical deformable mirrors for aberration control in optical systems," Optical and Quantum Elecs., 31, 451-68 (1999).
Written Opinion in International Patent Application PCT/US2015/012539, dated May 4, 2015.
International Search Report in International Patent Application PCT/US2015/012539, dated May 4, 2015.

* cited by examiner

OPTICAL IMAGING DEVICES AND VARIABLE-FOCUS LENS ELEMENTS, AND METHODS FOR USING THEM

CROSS-REFERENCE TO RELATED APPLICATIONS

This application is a U.S. national phase application of International Patent Application no. PCT/US2015/012539 filed on Jan. 22, 2015, which claims the benefit of priority of U.S. Provisional Patent Application No. 61/930,349, filed Jan. 22, 2014, which is hereby incorporated herein by reference in its entirety.

STATEMENT OF GOVERNMENT SUPPORT

This invention was made with U.S. government support under grant numbers 1353757 and 1602128, both awarded by the National Science Foundation, as well as grant number DC000566 awarded by the National Institutes of Health. The U.S. government has certain rights in the invention.

BACKGROUND OF THE DISCLOSURE

1. Field of the Disclosure

The present disclosure relates generally to devices and methods useful in imaging applications, especially biological imaging applications, in the metrology, scientific and medical fields, including deep brain imaging. More particularly, in certain aspects the present disclosure relates to optical lightguide-based optical imaging devices including them, and their use in in vivo imaging of tissue, using, for example, confocal and multiphoton techniques.

2. Technical Background

Patient care for many common diseases relies on biopsy and subsequent histology for diagnosis and monitoring of disease progression or response to treatment. Unfortunately surgical biopsy is invasive and, depending on the biopsy location, can require expensive treatment at a hospital and follow-up care. There is a clear desire on the part of both doctor and patient to minimize the number of invasive biopsies, sometimes at the expense of early detection or frequent monitoring of patient response to treatment.

Laser-scanning microscopy, especially using confocal or multiphoton methods, is a powerful technique for in vivo physiological imaging. The primary advantage of laser-scanning microscopy is the ability to extract thin optical sections, which is important for imaging cells in thick tissue. Optical sectioning combined with axial scanning enables the collection of full three-dimensional (3D) data from tissue. This technique is especially useful for functional imaging of cellular network dynamics, which often appear in multiple focal planes.

Multiphoton imaging generates cell-resolved structural images of a 3D region of the tissue (0.5 mm×0.5 mm×0.5 mm typical) similar to standard histology that provide diagnostic information. It has the additional benefit of imaging the live tissue without processing that can often cause artifacts. Intrinsic fluorescent compounds in the tissue can provide unique diagnostic information beyond that of standard histology. Diagnostic criteria for distinguishing cancerous and non-cancerous tissue using multiphoton images are in the process of development. Other disease criteria can be determined such as degree of fibrosis or inflammation of the tissue or the presence of saturated/unsaturated lipids. Potential applications for this technology include guided standard biopsy to screen broader areas of tissue before sampling and real-time feedback in surgery.

All multiphoton and confocal fiber coupled imaging devices that have been demonstrated to-date suffer from a complicated or large optical scanning footprint as well as limited collection efficiency and resolution. Optical imaging methods without or combined with fluorescent markers offer the unprecedented ability to study functioning of the complex neural networks in the brain down to the resolution of individual neurons. However, due to light scattering in tissue, it is only possible to perform microscopy imaging down to ~2 mm from the surface of the brain, leaving over 75% of the brain that cannot be studied. Technology that offers the path for high resolution deep brain functional imaging is urgently needed in order to further advance the fundamental understanding of how the brain works.

In order to provide maximum flexibility for imaging of biological systems, it would be desirable to provide a miniaturized fiber-coupled microscope (FCM) having high-speed axial focusing capability. FCMs that allow for fast lateral scanning by using miniaturized two-dimensional (2D) scanners or imaging through a high-density coherent fiber bundle are known. Most of these devices image at a single fixed focal depth. To achieve axial scanning with a FCM, the focus spot must be translated axially through the tissue at high-speed ($\geq 10$ Hz) without moving the specimen. Further, the focusing mechanism must be small enough to be implemented at the distal end of the fiber without greatly increasing the FCM size and weight. Some multi-focal techniques have been shown to be potentially compatible with a FCM system. Examples include small motors, thermomechanical actuators, deformable mirrors, and spatial and temporal focusing. However, technical challenges have thus far limited the development of laser-scanning FCMs with axial scanning capabilities. Mechanical actuators have low bandwidth and can introduce movement artifacts. Micro-mirrors have relatively low reflectivity and require complex optical setups. Spatial and temporal focusing suffers from low signal efficiency and does not allow for lateral scanning. Other groups have demonstrated optical designs that can image multiple fixed focal planes, but do not allow for the flexibility of continuous focusing. Variable focus lenses have been shown to be capable of high-bandwidth scanning with no mechanical actuation.

There remains a need for optical imaging technologies that overcome one or more of these shortcomings in the art.

SUMMARY OF THE DISCLOSURE

In one aspect, the present disclosure provides an optical imaging device comprising
  a flexible lightguide having a first end and a second end, the output of the source of pulsed infrared radiation being optically coupled to the first end of the flexible lightguide;
  a lens assembly attached to and optically coupled to the second end of the flexible lightguide, the lens assembly comprising a variable-focus lens element, the variable-focus lens element having a tunable focal length; and
  a photodetector coupled to the flexible lightguide to detect radiation propagating from the second end toward the first end of the flexible lightguide.

In another aspect, the present disclosure provides an method for imaging a sample, the method comprising transmitting optical radiation from a flexible lightguide through a lens assembly comprising a variable-focus lens element, the variable-focus lens element having a tunable focal length, thereby focusing the radiation on or in the sample;

transmitting radiation emanating from the sample in response to the pulsed infrared radiation to the flexible lightguide through the lens assembly; and transmitting the emanated radiation to a photodetector; then changing the focal length of the variable-focus lens element, and repeating the transmitting steps.

BRIEF DESCRIPTION OF THE DRAWINGS

FIG. 8 is a schematic view of the overall system. A laser scanning confocal microscope is used to scan the laser focus into individual fiber cores. An imaging lens (IL) collimates light from fiber cores into variable focus (VF) lens. The objective lenses (OL) focus light from the VF lens onto the object plane. Distance between the VF lens and the OL is variable from 2-5 mm. IL is an achromatic lens with a focal length of 3 mm. OL consists of two achromatic lenses with a focal length of 2 mm. The VF lens is an electrowetting lens whereby an electrode changes the voltage on the lens in order to vary the focal length. FIG. 9 is a CAD model of a plastic adapter and optical components along with dimensions. The VF lens assembly is clamped between the top (900) and bottom (905) sections of the adapter using an O-ring. The imaging lens (IL) is fit into the top section and the objective lenses (OL) are glued inside 1 mm diameter thin-walled polyimide (PI) tubing. FIG. 10 is a photograph of the assembled adapter alongside separated VF lens.

FIG. 11 is an image of fixed 15 μm thick slice of mouse piriform cortex taken with a laser-scanning confocal microscope using a 10×, 0.4 NA objective. Immunofluorescently labeled for pyramidal neurons. FIG. 12 is an image of the same region imaged with a device as described herein, post-processed by band-stop filtering. FIG. 13 provides zoom-in images of the cell bodies indicated by arrows in FIG. 12. Top: Raw FCM image showing pixilation due to fiber-cores. Middle: FCM image after band-stop filtering. Bottom: Comparison with confocal microscope image. (Scale bar is 10 μm).

FIG. 14 is an orthogonal projection (inverted grayscale) of 1 μm diameter red fluorescent beads in agarose, imaged while scanning the Z-stage over a range of 100 μm (left) and same region imaged while varying optical power of VF lens (right). Horizontal grey lines indicate Z-depths of 20, 40, 60, and 80 μm from shortest focus. In the graph of FIG. 15, the light gray line shows simulated focal length change while varying the VF lens optical power. Solid black dots indicate experimental data from 40 beads used to map VF lens optical power to relative Z-depth.

FIG. 16 provides lateral and axial images of a single 1 μm bead imaged with confocal pinhole set to allow light collection from multiple fibers (Open) or just one fiber (Closed). FIG. 17 is a graph of a theoretical profile of a fiber core (solid gray line) compared to experimental profiles of an average of 15 beads taken with open pinhole (dashed gray line) or closed pinhole (black line). FIG. 18 is a graph of the diffraction-limited axial point spread function (solid gray line) compared to the experimental axial profile of an average of 15 beads with open pinhole (dashed gray line) or closed pinhole (black line) conditions.

FIG. 19 is a maximum intensity projection of an image stack of intact olfactory neuron axons labeled with yellow fluorescent protein (YFP). 36 images taken through the full focal range of the VFL were used to construct the projection. Field of view is ~300 μm. FIG. 20 provides images of four optical sections that were taken at specific VFL optical power settings. Positive Z-position is the distance from shortest focal length. (Scale bar is 100 μm).

DETAILED DESCRIPTION

Figure 1:
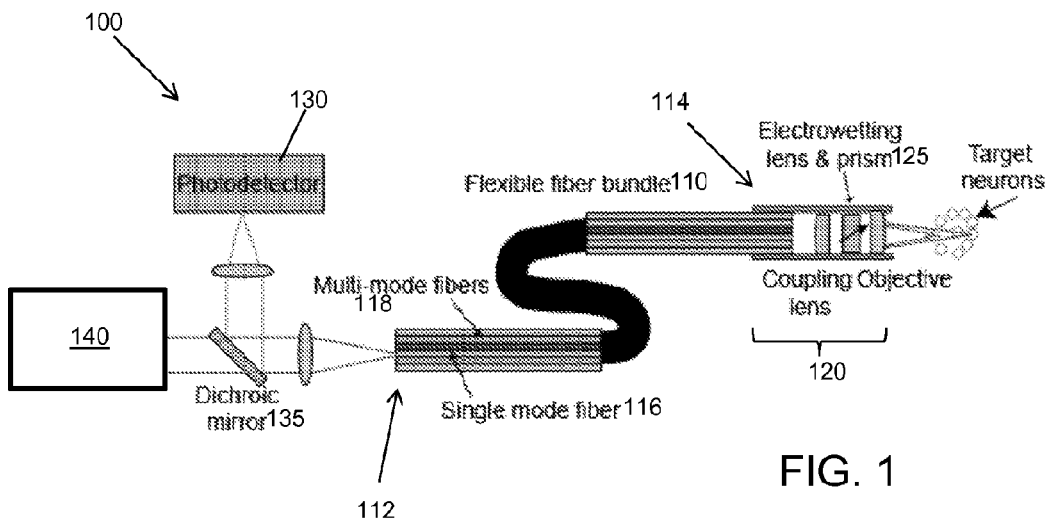
FIG. 1 is a schematic view of an optical imaging device according to one embodiment of the disclosure.

Before the disclosed processes and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

This disclosure relates in certain aspects to a fiber-optic imaging instrument incorporating adaptable optics. The miniature fiber-optic imaging system implanted minimally-invasively will enable visualization of hundreds of neurons deep in the brain. The large volume of imaging is important for understanding the complex interconnections involved in neural networks while access to new regions of the brain will open up study in important areas of the brain that are currently not accessible with other techniques. The imaging systems and methods described herein can be used in a variety of other applications, for example, in microscopy, medicine, and other scientific research. Particular examples of applications include two-photon imaging and fluorescence imaging (e.g., of brain tissue or lung tissue).

The materials included herewith are intended to describe certain features according to various embodiments and aspects of the invention. However, the description provided herewith is not intended to be limiting in any particular aspect. As the person of ordinary skill in the art will appreciate, various modifications can be made to the particular systems and methods described herein without departing from the scope of disclosure. For example, well known optical components and techniques can be used to provide the desired properties to the overall lens assembly; to construct the pulsed radiation sources as described herein; and to otherwise configure the devices described herein.

One aspect of the disclosure is an optical imaging device that includes a flexible lightguide having a first end and a second end, a lens assembly attached to and optically coupled to the second end of the flexible lightguide, the lens assembly comprising a variable-focus lens element, the variable-focus lens element having a tunable focal length (e.g., a continuously tunable focal length); and a photodetector coupled to the flexible lightguide to detect radiation propagating from the second end toward the first end of the flexible lightguide.

One embodiment of such a device is shown in schematic view in FIG. 1. Optical imaging device 100 includes a flexible lightguide (e.g., a flexible fiber bundle or a dual-cladding fiber) 110, which has a first end 112 and a second end 114. The first end of the flexible lightguide can, for example, be configured to be optically coupled to a source of radiation, as described in further detail below. The optical imaging device further includes a lens assembly 120 attached to and optically coupled to the second end of the flexible lightguide. The lens assembly includes at least a variable-focus lens element (e.g., an electrowetting lens & prism) 125. The variable-focus lens element has a tunable focal length, for example, as described in further detail below. Thus, the variable-focus lens element can allow for overall lens assembly to achieve imaging at variable depths without the need for mechanically moving parts. As described in further detail herein, the variable-focus lens element can be driven by an applied voltage that allows its focal distance to be tuned. For example, the application of a voltage can tune the shape of an electrowetting lens element (e.g., formed by the surface of the electrowetting liquid) to be varied (e.g., from less convex to more convex, from more concave to less concave, or even from convex to concave). In certain embodiments, and as described in more detail herein, a variable-focus lens element (e.g., an electrowetting lens assembly) can also be configured to provide tunable positioning of the focused beam (i.e., in a direction perpendicular to the optical axis). Alternatively, a separate variable prism element can be used (e.g., an electrowetting prism element). The position or angle of the lens assembly can in some embodiments be changed; or excitation radiation can be coupled through different fibers in a fiber bundle to provide lateral scanning. The device 100 also includes a photodetector 130 coupled to the flexible lightguide to detect radiation propagating from the second end toward the first end of the flexible lightguide.

The device can be designed to image, for example, biological samples such as tissue. Thus, the device can be configured as an endoscope for medical imaging. Of course, in other embodiments, the device can be configured for laboratory use, e.g., for metrology or scientific applications. In use, radiation can be coupled from an optical source into the first end of the flexible lightguide, be transmitted to the second end of the lightguide, through the lens assembly and into a sample to be imaged at a particular focal length addressed via the variable-focus lens element. The radiation interacts with the sample, and radiation characteristic of the sample in the neighborhood of the focus point (e.g., reflected radiation, fluorescence, phosphorescence, or radiation from nonlinear processes) is emanated by the sample and collected by the lightguide at the second end and transmitted to the photodetector. The radiation characteristic of the process can be, in many embodiments, of a different wavelength than that of the radiation from the optical source. For example, in single-photon fluorescence-based techniques, the emanated radiation can be of a longer wavelength than that of the optical source. In many two-photon based techniques (e.g., SHG, TPAF, CARS), the emanated radiation is of a shorter wavelength than that of the optical source.

A variety of optical radiation sources can be used in conjunction with the devices described herein. In fact, in certain embodiments, the device itself further includes a source of optical radiation 140 (having an output; the output of the source of optical radiation being optically coupled to the first end of the flexible lightguide. In certain embodiments, the radiation is visible radiation or infrared radiation. In one particular embodiment, the radiation is infrared radiation. The radiation can be provided as continuous wave, or alternatively in a short pulse format. In certain embodiments, the source of optical radiation is a source of pulsed infrared radiation, e.g., having a pulse width in the range fs to ns. The radiation can be of substantially a single wavelength (e.g., centered at one particular peak wavelength), or, in other embodiments, of a plurality of different wavelengths (e.g., substantially of two peak wavelengths). For example, two lasers can be used to provide two different wavelengths. The wavelength range is flexible and, in certain embodiments, covers the visible and infrared regions; the person of ordinary skill in the art will select the wavelength(s) desirable for a particular application. However, in the embodiments described, we focus on visible and near-infrared wavelengths for biological imaging. For example, in one embodiment, the radiation has a single peak wavelength in the range of 900-1000 nm (e.g., at about 925 nm). In another embodiment, two lasers are used to provide wavelengths of 816 and 1064 nm. In certain embodiments, a source of pulsed radiation provides pulses having a photon flux in the range of $10^6$-$10^8$ W/cm$^2$. In one embodiment, the source of pulsed radiation is a pulsed Ti:sapphire laser. Other sources can be used, e.g., other solid-state and fiber lasers. Of course, in other embodiments, continuous wave radiation can be used, from any convenient source, e.g., diode lasers, fiber lasers.

In other embodiments, a source of pulsed radiation comprises a continuous wave diode laser coupled to an intensity modulator to provide pulsed radiation; a phase modulator coupled and to spectrally broaden the pulsed radiation; a dispersion compensation element (e.g., optical fiber) coupled to narrow the temporal pulse width of the spectrally-broadened radiation; and a section of optical fiber coupled to further narrow the temporal pulse width through nonlinear broadening. In certain such embodiments, the source of radiation further includes an optical amplifier coupled between the intensity modulator and the phase modulator to compensate for losses. As described in further detail below, such an optical source can provide femtosecond pulses from compact efficient single-mode diode laser sources, making them attractive for integration into the devices described herein. Particular embodiments of such "time-lens" optical sources are described in further detail below.

The person of ordinary skill in the art will appreciate that the devices and methods described herein can be used in conjunction with a wide variety of imaging methods. For example, the methods and devices described herein can be adapted for use with a variety of multiphoton processes such as, for example, coherent anti-Stokes Raman scattering (CARS), two-photon excitation autofluoresence (TPAF), second harmonic generation (SHG), third harmonic generation (THG) and stimulated Raman scattering (SRS). Multiphoton processes are especially advantageously used, especially for imaging unstained or unlabeled live tissue or in vivo. Such methods can take advantage of the tunable focusing ability of the lens assembly including the variable-focus lens elements described herein, in order to obtain a full three dimensional image of the tissue. But while the devices and methods are described herein with respect to multiphoton methods (e.g., using pulsed radiation), the person of ordinary skill in the art will appreciate that the devices and methods can also be used in a variety of single-photon based techniques, e.g., spectroscopic imaging techniques (e.g., Raman spectroscopy) or fluorescence imaging techniques. In such cases, the source of optical radiation can be, for example, a continuous wave source, e.g., a compact diode laser or fiber laser operating in the visible or infrared. The photodetector can be configured by the person of ordinary skill in the art to detect radiation transmitted from the second end to the first end of the flexible lightguide. For example, in certain embodiments of the devices as described herein, the photodetector is optically coupled to the first end of the flexible lightguide, as shown in FIG. 1.

In many optical techniques, the wavelength of the radiation returning through the lightguide from the sample is different than the wavelength of the radiation transmitted to the sample (e.g., shorter, or longer, as described above). In such cases, it can be desirable to include an optical filter coupled between the photodetector and the flexible lightguide, the optical filter being configured to substantially prevent radiation of the wavelength of the source of pulsed infrared radiation from reaching the photodetector. For example, in certain embodiments, the photodetector is optically coupled to the first end of the flexible lightguide, and the optical imaging device further comprises an optical filter being optically coupled between the first end of the flexible lightguide and the photodetector, and between the first end of the flexible lightguide and the source of radiation, the optical filter being configured to couple the radiation from the source of radiation to the first end of the flexible lightguide, and to couple radiation having a substantially different wavelength than the wavelength of the radiation from the source of radiation from the first end of the flexible lightguide to the photodetector. The optical filter can be, for example, a dichroic mirror configured to reflect the radiation having a substantially different wavelength than the wavelength of the radiation from the source of radiation from the first end of the flexible lightguide to the photodetector and to transmit the radiation from the source radiation to the first end of the flexible lightguide. In one embodiment, the optical filter is a dichroic mirror configured to transmit the radiation having a substantially different wavelength than the wavelength of the radiation from the first end of the flexible lightguide to the photodetector and to reflect the radiation from the source of pulsed infrared radiation to the first end of the flexible lightguide. Such a dichroic mirror is identified as element 135 in FIG. 1. Of course, other the person of ordinary skill in the art will understand that a variety of other types of filters could be used to couple the radiation from the source of radiation to the first end of the flexible lightguide, and to couple radiation having a substantially different wavelength than the wavelength of the radiation from the source of radiation from the first end of the flexible lightguide to the photodetector, such as prism elements, gratings, or acousto-optic modulators.

As the person of ordinary skill in the art will appreciate, a wide variety of flexible lightguides can be used in various embodiments of the devices and methods as described herein. In one embodiment, the flexible lightguide includes an excitation waveguide (e.g., an optical fiber) having a first end at the first end of the flexible lightguide and a second end at the second end of the flexible lightguide. The excitation waveguide can be, for example, single-mode at the wavelength of the source of pulsed infrared radiation. The output of the source of radiation can be optically coupled (e.g., through one or more filters as described above) to the first end of the excitation waveguide. In certain embodiments, the flexible lightguide includes one or more detector waveguides, each of the one or more detector waveguides having a first end at the first end of the flexible lightguide and a second end at the second end of the flexible lightguide. The one or more detector waveguides can be, for example, multimode at the wavelength of the source of radiation. Use of multimode optical fibers can help to enhance collection efficiency, and thus provide increased sensitivity and dynamic range to the optical imaging device.

As the person of ordinary skill in the art will appreciate, the flexible lightguide can take many forms, such as a multi-core waveguide (e.g., a multi core fiber, fiber optic bundle or double-cladding fiber). For example, in one embodiment, the flexible lightguide is a bundle of optical fibers. The bundle of optical fibers can include an excitation fiber and a plurality of detector fibers, each of the excitation fiber and detector fibers having a first end at the first end of the flexible lightguide and a second end at the second end of the flexible lightguide, wherein the output of the source of radiation is optically coupled to the first end of the excitation fiber, and the photodetector is optically coupled to the first ends of the plurality of detector fibers. The excitation fiber can be at least partially surrounded, e.g., substantially surrounded, by a plurality of detector fibers. In all such embodiments, the excitation fiber can be, for example, single mode, and the detection fibers can be, for example, multimode. The coupling can be via free space optics (e.g., as shown for excitation optical fiber 116 and detector optical fibers 118 in FIG. 1). In certain embodiments, the lightguide is about 2 mm or less in diameter (e.g., about 1.5 mm or less, about 1 mm or less, or even about 500 µm or less).

In certain embodiments, the flexible lightguide is a single optical fiber. In one particular embodiment, the flexible lightguide is a double-cladding optical fiber, i.e., having a core surrounded by a first cladding and a second cladding surrounding the first cladding, the second cladding being lower in refractive index than the first cladding and the first cladding being lower in refractive index than the core. The excitation radiation can be substantially confined in the core, and the radiation emanated from the sample can be substantially confined in the first cladding and the core.

Figure 2:
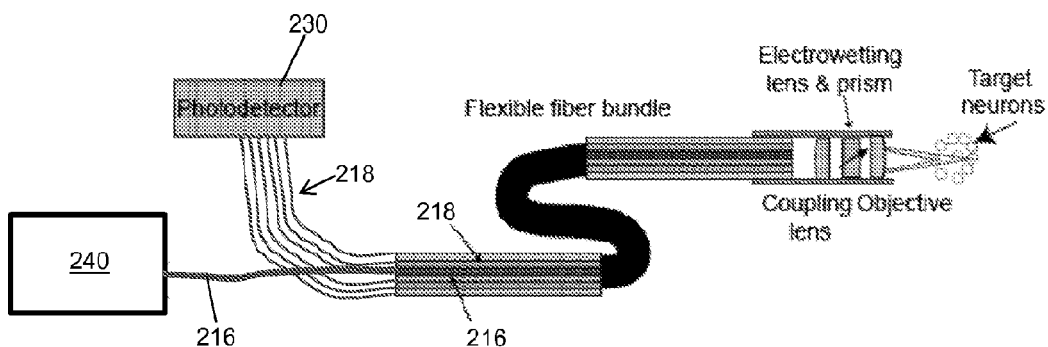
FIG. 2 is a schematic view of an optical imaging device according to another embodiment of the disclosure.

In other embodiments, the excitation optical fiber is routed differently than the detector optical fiber(s), and so the coupling of the excitation optical fiber to the source of radiation can be spatially separated from the coupling of the detector optical fiber(s) to the photodetector. For example, the various fibers of a fiber bundle can be routed differently at the first end thereof, with an excitation fiber being coupled to the optical source and the detector fiber(s) being coupled to a photodetector. Such an embodiment is shown in schematic view in FIG. 2. For example, the excitation fiber 216 can be coupled (e.g., via pigtailing) to the source of optical radiation 240; and the detector fibers 218 can be coupled to the photodetector 230.

As noted above, the optical imaging devices described herein include a lens assembly attached to and optically coupled to the second end of the flexible lightguide. Critically, the lens assembly includes a variable-focus lens element, which has a tunable focal length, e.g., ranging from about infinity to about +/−1 mm. Thus, the focal length of the variable-focus lens element can be changed with, for example, an applied voltage or applied pressure. For example, in certain embodiments voltages in the range of 0 V to about 20 V can be used to change the focal length of the variable-focus lens element. In other embodiments, applied voltages in the range of 0 V to about 10 V, e.g., 0 V to about 7 V, or about 3 V to about 10 V, or about 3 V to about 7 V, or about 3 V to about 20 V, or about 5 V to about 10 V, or about 5 V to about 20 V, or about 10 V to about 20 V, e.g., about 5 V, can be used. The focal length of the lens assembly can range, for example, from 200 microns to 1 mm. In certain embodiments, the focal length of the lens assembly can be tuned over a range (i.e., the difference between the focal distance from one end of the tuning range to the focal distance at the other end of the tuning range, or the axial scanning range) of at least 5 μm, at least 10 μm, at least 25 μm, at least 50 μm, or even at least 100 μm (and, e.g., up to about 1 mm, or up to about 500 μm). In many embodiments, axial scanning ranges can be hundreds of microns. Desirably, the focal length of the variable-focus lens element changes monotonically with applied voltage. Thus, during operation, the focal length of the variable-focus lens element can be tuned through the application of various voltages or pressures, so that the sample can be interrogated with radiation at different depths without physically moving the overall lens assembly.

In certain embodiments, variable-focus lens element has, in addition to the tunable focal length, a tunable focal position in a dimension perpendicular to the direction of propagation of radiation through the lens assembly. The focal position of the lens assembly can be tunable, for example, by applied voltage, e.g., at voltages in the range of 0 V to about 20 V, or even in the range of 0 V to about 10 V, e.g., 0 V to about 7 V, or about 3 V to about 10 V, or about 3 V to about 7 V, or about 3 V to about 20 V, or about 5 V to about 10 V, or about 5 V to about 20 V, or about 10 V to about 20 V, e.g., about 5 V. The tunable focal position can be, for example, in substantially one dimension, or in two dimensions. In certain embodiments, the focal position of the lens assembly can be tuned over a range (i.e., the difference between the focal position from one end of the tuning range to the focal position at the other end of the tuning range, or the lateral scanning range) of at least 2.5 μm, at least 5 μm, at least 10 μm, at least 25 μm, or even at least 50 μm (and, e.g., up to about 1 mm, up to about 500 μm, or up to about 200 μm). In many embodiments, lateral scanning ranges can be tens or even hundreds of microns. Thus, in combination with the tunable focal length, the tunable focal position can be used to scan a two- or even three-dimensional space of the sample without moving the overall lens assembly.

In other embodiments, a separate tunable prism assembly can be used. Such a tunable prism assembly can be, for example, an electrowetting prism assembly formed as described herein, using, for example, a rectangular-shaped cavity, a circular shaped cavity, an oval shaped cavity, a cylindrical tube, a rectangular tube, or an oval shaped tube.

The lens assembly can further include additional optics, e.g., focusing and collimating lenses, to provide for the desired coupling into the lightguide and the desired focal point in the sample. Thus, the variable-focus lens element need not be the only element that operates to focus radiation at a point within the sample; the bulk of the focal power may be provided by one or more lenses, and the variable-focus lens element may serve to tune the axial position of the focal point, as the person of ordinary skill in the art will appreciate. For example, in one particular embodiment, the lens assembly further comprises a first lens system (e.g., a collimator or a focusing lens) coupled between the second end of the flexible lightguide and the variable-focus lens element; and a second lens system (e.g., a focusing lens, or the combination of a GRIN lens and a focusing lens, or an objective lens system) coupled at the output of the variable-focus lens element, for example to provide the desired overall focal distance into a sample. In certain embodiments, the lens assembly is about 2 mm or less in diameter (e.g., about 1.5 mm or less, or even about 1 mm or less).

The variable-focus lens element can take many forms. For example, in certain embodiments, the variable-focus lens element is a pressure-driven lens element, for example, as described in R. D. Niederriter et al., Applied Optics, 52(8), 1591-98 (2013), which is hereby incorporated herein by reference.

In another embodiment, the variable-focus lens element is an electrowetting lens element. An embodiment of an electrowetting lens element suitable for use as a variable-focus lens element is shown in cross-sectional view in FIG. 3. Electrowetting lens element 350 includes a transparent substrate 355 having a surface 356. One or more sidewalls 360 extend from the surface of the substrate, the one or more sidewalls having surfaces (here, surfaces 362) that define a cavity 365. Two liquids are disposed within the cavity: a polar liquid 370 and a second liquid 372. The second liquid is immiscible with the polar liquid and has a different index of refraction than the first liquid (e.g., at the wavelength of the source of radiation). Thus, the polar liquid and the second liquid form two distinct liquid phases within the cavity. The second liquid is electrically insulating (non-polar). The device also includes one or more first electrodes 375 disposed along the sidewalls of the cavity (or on the internal surface of a top cover as described below); and one or more transparent second electrodes 377 electrically isolated from the first electrodes on the bottom of the cavity.

The one or more sidewalls can be formed at a variety of angles. For example, the one or more sidewalls can extend from the substrate such that they have an angle with the substrate no more than 20 degrees from normal, no more than 10 degrees from normal, or even no more than 5 degrees from normal. The one or more sidewalls can be formed from a variety of materials, for example, a polymer, a semiconductor or a dielectric. The person of ordinary skill will appreciate that the sidewalls can be formed using a variety of techniques, e.g., molding, photolithography, 3D printing, and selective etching. In certain embodiments, a photodefinable polymer (e.g. an epoxy-based photoresist such as SU-8) is used.

In certain embodiments, the electrowetting lens element further includes a transparent cover disposed over one or more sidewalls, the cover having a surface substantially closing the cavity. That is, in such embodiments the cavity can be substantially enclosed by the substrate, the cover, and the one or more sidewalls. The transparent cover is indicated by reference number 380 in FIG. 3. In certain embodiments, the one or more first electrodes are positioned on an internal surface of the cover instead of on the sidewalls. In other embodiments, the one or more first electrodes are positioned on an internal surface of the cover and on the sidewalls.

In certain embodiments, one or more voltage sources are coupled between the one or more first electrodes along the sidewalls of the cavity and the one or more second electrodes. The one or more voltage sources can be configured to apply a voltage between the one or more first electrodes and the one or more second electrodes, for example, at the voltages described above, to address the focal length and/or focal position of the electrowetting lens element. This is shown, as described in more detail below, in FIG. 4.

The sidewalls can have one or more dielectric coatings formed thereon. The total thicknesses of such coatings can be, for example, less than about 1 μm, less than about 500 nm, or even less than about 300 nm in thickness. Such coatings can be, for example, greater than about 10 nm in thickness. Conventional techniques such as atomic layer deposition and chemical vapor deposition can be used to form the one or more dielectric coatings. The one or more dielectric coatings can include, for example, aluminum oxide (e.g., $Al_2O_3$), silicon oxide (e.g., $SiO_2$), silicon nitride (e.g., $Si_3N_4$), silicon oxynitride, titanium dioxide (e.g., $TiO_2$), or a combination thereof. In other embodiments, parylene can be deposited by chemical vapor deposition. In one particular embodiment, the one or more dielectric coatings comprise a layer of aluminum oxide covered by a layer of silicon oxide or titanium oxide.

In certain embodiments, the surface of the cavity in contact with the polar liquid and the second liquid is substantially hydrophobic, e.g., having a water contact angle greater than about 50 degrees, greater than about 70 degrees, or even greater than about 90 degrees. For example, in certain embodiments, the surfaces of the sidewalls defining the cavity have one or more coatings formed thereon, wherein the outermost coating (i.e., contacting the polar liquid) of each is a substantially hydrophobic coating. In certain embodiments, the outermost coating of the one or more sidewalls comprises a substantially hydrophobic polymer (e.g., Teflon AF) or organically modified silicate (e.g., formed by an organic or fluorinated organic trifunctional silane) (e.g., total thickness less than about 500 nm, or even less than about 100 nm).

The person of ordinary skill will appreciate that the one or more electrodes disposed on the sidewalls in a variety of configurations. In certain embodiments, the one or more electrodes disposed along the sidewalls of the cavity are disposed between the sidewalls and any substantially dielectric and hydrophobic coatings. The electrodes can be formed from a variety of materials, e.g., copper, silver, gold, chromium, indium-tin oxide or zinc oxide. The one or more second electrodes can also be provided in a number of configurations. For example, the one or more second electrodes can be provided on the substrate. In other embodiments, the one or more second electrodes are provided on a cover. The electrodes can be formed and patterned using standard micro- and nano-fabrication techniques such as lithography, sputtering, thermal evaporation and chemical vapor deposition.

In certain embodiments, one or more of the sidewalls (e.g., each sidewall) has formed thereon an electrode layer (e.g., Cu, Ag, Au, ITO or ZnO); a layer of aluminum oxide (for example, $Al_2O_3$, e.g., deposited by ALD, for example, thickness in the range of about 20 nm to about 200 nm, e.g., about 100 nm); a layer of silicon oxide (for example, $SiO_2$, e.g., deposited by ALD, for example, thickness in the range of about 5 nm to about 100 nm, e.g., about 10 nm); and a hydrophobic coating (for example, a polymer or an organically modified silicate (e.g., formed by an organic or fluorinated organic trifunctional silane, for example having a thickness less than about 300 nm, less than about 200 nm, less than about 100 nm, or even less than about 50 nm)).

The polar liquid can take many forms. For example, in certain embodiments, the polar liquid is an aqueous liquid. The polar liquid can be, for example, aqueous ionic surfactant such as aqueous sodium dodecyl sulfate, or an aqueous solution of an ionic compound. Similarly, the second liquid can take many forms, as long as it is electrically insulating, immiscible with the polar liquid, of different refractive index from the polar liquid, and substantially density matched to the polar liquid. The second liquid can be, for example, a silicone oil, e.g., trimethylsiloxy-terminated poly(dimethylsiloxane).

The cavity itself can have a variety of shapes. For example, in one embodiment, the cavity is substantially circular in shape, as shown in the exploded perspective view of FIG. 5. In other embodiments, the cavity is substantially rectangular, substantially triangular, or substantially hexagonal. Of course, the person of ordinary skill in the art can select other shapes for the cavity. In various embodiments of the electrowetting lens elements as described herein, the cavity is in the range of about 100 μm to about 1 mm in depth, and/or in the range of about 200 μm to about 2 mm in width.

Figure 6:
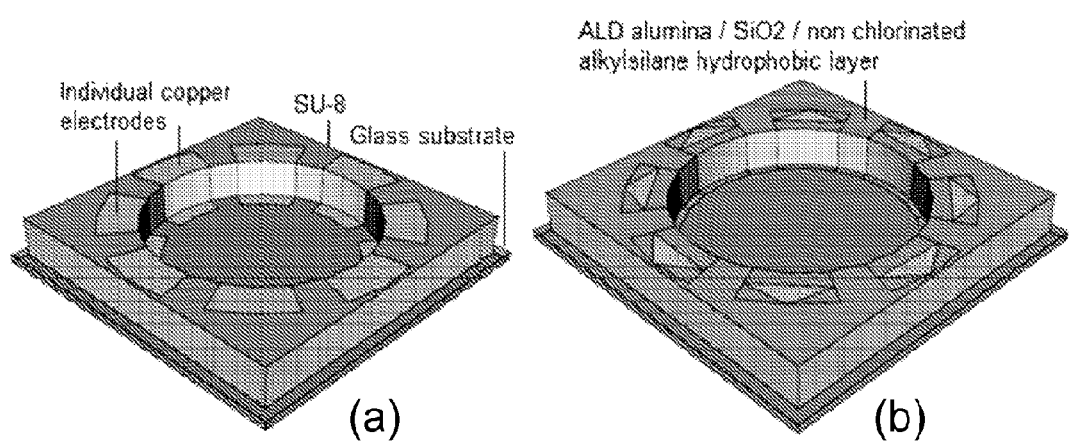
FIGS. 6(a) and 6(b) are a pair of views of the fabrication of an electrowetting lens element according to one embodiment of the invention. A plurality of first electrodes are provided, that, in combination with the application of different voltages, can tailor the shape of the surface of the first liquid, and thus both the focal length and focal position of the electrowetting lens element. Such a lens element can thus be termed a lens/prism element or a lens and prism. Leads would trace out from under the top cover glass.
Figure 7:
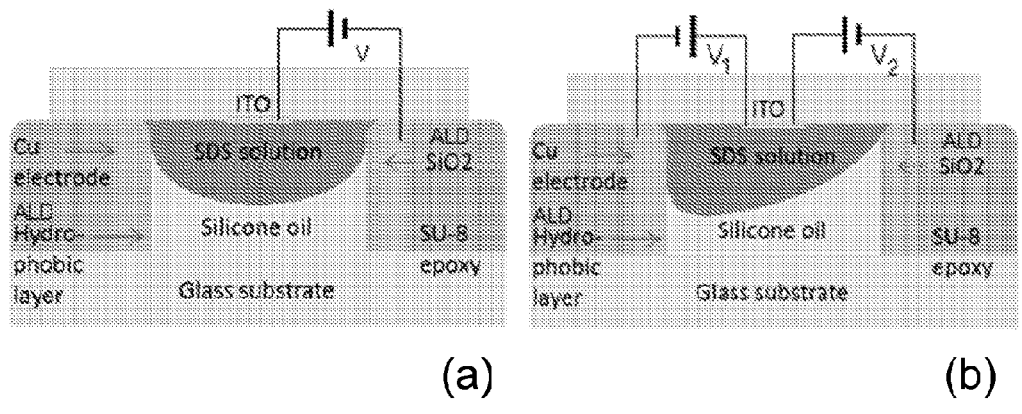
FIG. 7(a) is a cross sectional schematic view of assembled variable focus liquid lens for miniature microscopy applications.
FIG. 7(b) is a cross sectional schematic view of a combination lens/prism element showing the effect of several different voltages on the droplet surface. In each, from the SU-8 sidewall to the cavity holding the liquids, there are, in order, a layer of copper electrode, a layer of ALD-deposited $SiO_2$, and a layer of an ALD-deposited hydrophobic layer.

In certain embodiments, a plurality of separately-addressable first electrodes are provided along the sidewalls, as shown in FIG. 6. Separately-addressable electrodes can allow the electrowetting lens to be addressed not only axially to provide a tunable focal length, but also laterally to provide a tunable focal position. This is shown in FIG. 7; as described in more detail below, putting different biases on different electrodes can allow the droplet of polar liquid to be pulled more toward one sidewall than another, thus translating the focal position of the lens assembly laterally. There can be, for example, two, three, four, six or eight separately-addressable electrodes. The separately-addressable electrodes can be, for example, symmetrically distributed along the sidewalls around the cavity. The number of separately-addressable electrodes can be, for example, the same as the number of sidewalls (e.g., one on each sidewall). Each of the separately-addressable electrodes can be operatively coupled to a different voltage source, so that they can be differently addressed.

Figure 3:
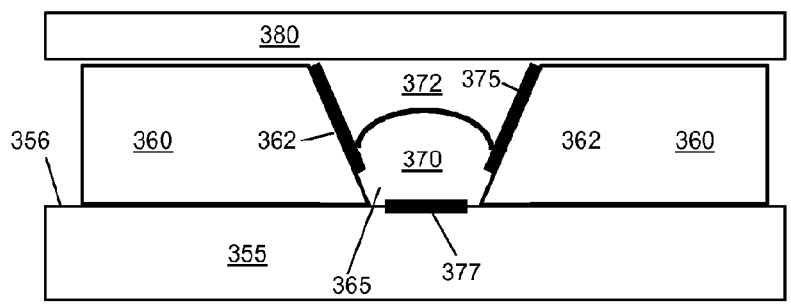
FIG. 3 is a schematic cross-sectional view of an electrowetting lens element according to one embodiment of the disclosure.
Figure 5:
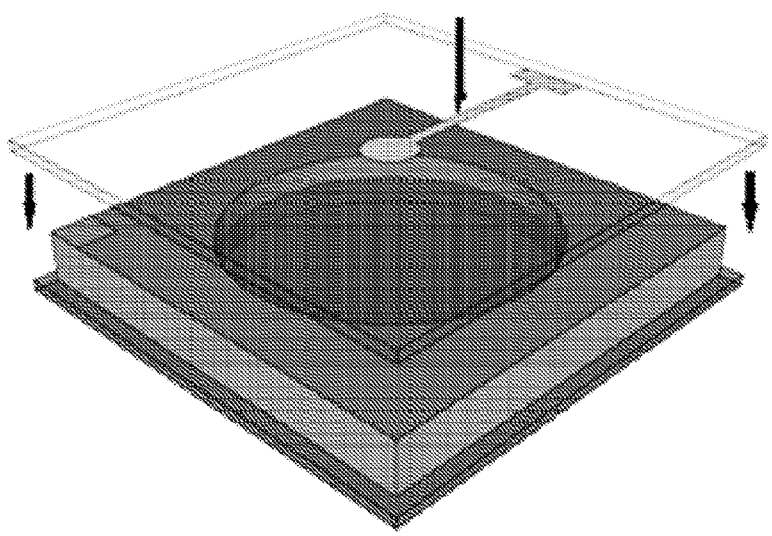
FIG. 5 is a schematic exploded perspective view of an electrowetting lens element according to one embodiment of the disclosure.

As noted above, the one or more second electrodes can, for example, be disposed on the substrate, or, if present, on a cover. In certain embodiments, a single second electrode is provided along the surface of the substrate (e.g., as shown in FIG. 3), or along the surface of the cover (e.g., as shown in FIG. 5). The single second electrode can be a common electrode against which the separately-addressable first electrodes are biased, i.e., it can be coupled to a plurality of voltage sources, each voltage source being coupled to a different separately-addressable first electrode along a sidewall. In other embodiments, a plurality of second electrodes are provided along the surface of the substrate or along the surface of the cover (if present). Each of the plurality of second electrodes can, for example, be coupled to a different voltage source.

Any second electrodes disposed on the substrate and/or on the cover are desirably substantially transparent (e.g., to the wavelength of the optical source). Accordingly, radiation can be transmitted through the lens element with relatively little optical loss. Such substantially transparent electrodes can be formed, for example, from indium tin oxide (ITO) or zinc oxide (ZnO), or a thin layer of gold. The person of ordinary skill in the art will appreciate that a variety of other transparent electrode materials can be used. If a substantially nontransparent second electrode is used, it desirably has a void formed therein to allow radiation to pass through.

Another aspect of the disclosure is a lens assembly comprising an electrowetting lens element as described herein. The lens assembly can include one or more optical elements (e.g., collimating or focusing lenses) before the input of the electrowetting lens element. The lens assembly can also include one or more optical elements (e.g., focusing lenses or objective lenses) at the output of the electrowetting lens element.

Another aspect of the disclosure is an electrowetting lens element as described herein.

Another aspect of the disclosure is a method for imaging a sample. The method includes transmitting optical radiation (for example, pulsed infrared radiation) from a flexible lightguide through a lens assembly including a variable-focus lens element, the variable-focus lens element having a tunable focal length, thereby focusing the optical radiation on or in the sample; transmitting radiation emanating from the sample in response to the optical radiation to the flexible lightguide through the lens assembly; and transmitting the emanated radiation to a photodetector; then changing the focal length of the variable-focus lens element, and repeating the transmitting steps. The optical imaging devices, the lens assemblies and the variable-focus lens elements described herein can be used to perform such methods. Relatively deep regions of the sample can be imaged by the devices and methods described herein.

In certain embodiments, the variable-focus lens element has, in addition to the tunable focal length, a tunable focal position in a dimension perpendicular to the direction of propagation of the optical radiation through the lens assembly (e.g., as described above), and the method further comprises changing the focal position of the variable-focus lens element, and repeating the transmitting steps.

In other embodiments, lateral imaging can be provided in a different manner. For example, when the flexible lightguide is a bundle of optical fibers, the source of radiation can be coupled to different optical fibers of the bundle (e.g., by physically scanning the first end of the lightguide relative to the source or scanning the source across the first end by passing through a galvometric mirror) to provide different focal positions. Alternatively, the lens assembly can be physically moved in order to provide lateral imaging.

Advantageously, the electrowetting lens elements described herein can provide for tunable focal lengths without the need for mechanically moving parts. In other embodiments, the variable-focus lens element can similarly provide for tunable focal lengths without the need for mechanically moving parts. Accordingly, in some embodiments, no mechanically moving parts are required to change the focal length of the lens assembly. Similarly, in certain embodiments, the electrowetting lens element has, in addition to the tunable focal length, a tunable focal position in a dimension perpendicular to the direction of propagation of the pulsed infrared radiation through the lens assembly, and wherein no mechanically moving parts are required to change the focal position of the lens assembly. Thus, in certain embodiments, the lens assembly includes no mechanically moving parts, and wherein no mechanically moving parts are provided at the second end of the lightguide.

As noted above, and described in further detail below, the methods and devices described herein can be used to image a wide variety of samples via a wide variety of techniques. The methods and devices can be especially advantageously used, for example, in performing multiphoton imaging such as two-photon fluorescence imaging and coherent anti-Stokes Raman scattering imaging. Thus, in certain embodiments, the radiation emanated by the sample results from two-photon absorption by the sample. The devices and methods can be used, for example, to image brain tissue, peripheral nerve endings or lung tissue. Of course, as the person of ordinary skill in the art will appreciate, the technologies described herein can be used in a wide variety of applications, including imaging of tissue more generally (e.g., optical biopsy).

Various additional particular features and embodiments are described below with respect to particular as-fabricated devices and experimental data. As the person of ordinary skill in the art will appreciate, the particular features and embodiments described below can be combined with the more general embodiments and aspects described above to form additional particular embodiments. However, the description provided herewith is not intended to be limiting in any particular aspect. As the person of ordinary skill in the art will appreciate, various modifications can be made to the particular systems and methods described herein without departing from the scope of disclosure. For example, well known optical components and techniques can be used to provide the desired properties to the overall lens assembly; and to provide any desired separation from excitation radiation and emitted radiation at the photodetector.

Miniature Fiber-Coupled Confocal Microscope with a Continuously Variable Focus with No Moving Parts For the first time in a laser-scanning fiber-coupled microscope (FCM), the inventors have demonstrated implementation of a variable focus lens (VFL) for axial scanning requiring no mechanically moving parts with the potential for high-speed and stable in vivo 3D imaging. The particular FCM described here weighs <1.9 g and achieves an imaging volume of ~320 µm diameter×80 µm with sub-cellular resolution.

Figure 8:
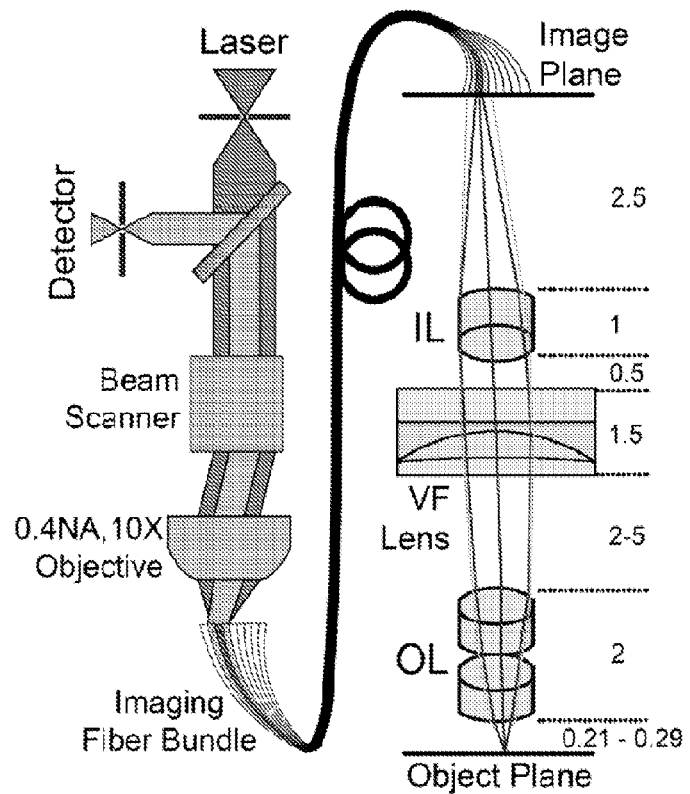
FIGS. 8, 9 and 10 relate to one embodiment of an imaging system design (dimensions in mm).

FIG. 8 shows the imaging setup designed to incorporate a VFL into the focusing optics. Dimensions are in mm. In short, a laser scanning confocal microscope was used to scan the laser focus into individual fiber cores. An imaging lens (IL) collimated light from fiber cores into variable focus (VF) lens. The objective lenses (OL) focused light from the VF lens onto the object plane. Distance between the VF lens and the OL was variable from 2-5 mm. A laser-scanning confocal microscope (Leica SP5 II) was used for continuous wave (CW) laser lines, spectrally filtered detectors, and resonant beam scanner. The device was fiber-coupled to the microscope, using a high-density coherent fiber-bundle with 0.5 m length, 30,000 count fiber cores, total effective imaging diameter of 0.8 mm, 2 µm core size, and 4.5 µm inter-core distance (Fujikura, FIGH-30-850N). The excitation laser light was focused onto the proximal surface of the fiber-bundle by a 10×0.4 numerical aperture (NA) objective.

Lateral scanning was performed by raster-scanning the laser into individual fiber cores. Similar coherent fiber-bundles are known to provide good lateral resolution (3-4 µm) when coupled with miniature imaging optics. Fiber-bundles also allow for the imaging of specific sub-regions of interest with laser-scanning microscopy (LSM), and allow for confocal sectioning. This particular imaging fiber-bundle was selected because of its small core size, high transmission, and low autofluorescence background. At the distal end of the fiber, a 1-mm diameter achromatic doublet with a 3-mm focal length (Edmund Optics, 65-566) is used to collimate the light exiting from the cores. Achromatic doublets were used because they are known to provide superior balance between focal length, optical aberrations, and numerical aperture (NA), which are the main parameters for efficient fluorescence collection. The VFL is placed in the infinity space of a miniature telescopic imaging system, where changing the focal length of the VFL results in a shift of the front focal length of the microscope. For the VFL was used a Varioptic Arctic 316 tunable lens, which has an effective focal length that ranges from −16 to +36 mm (−5 to 13 m$^{-1}$ in diopters) corresponding to a voltage input from 25 to 60 V$_{RMS}$ provided through a flexible lens cable. The excitation light was then focused on the sample using two 1 mm diameter achromatic doublets with a focal length of 2-mm (Edmund Optics, 65-565). For each fiber core that was scanned, the fluorescence emission was transmitted back through the same fiber and registered on the confocal microscope internal photomultiplier detector.

Figure 9:
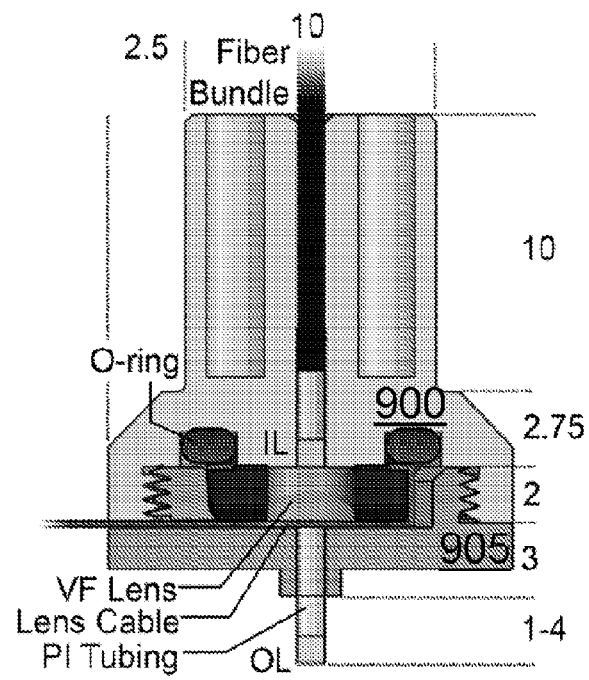
Figure 10:
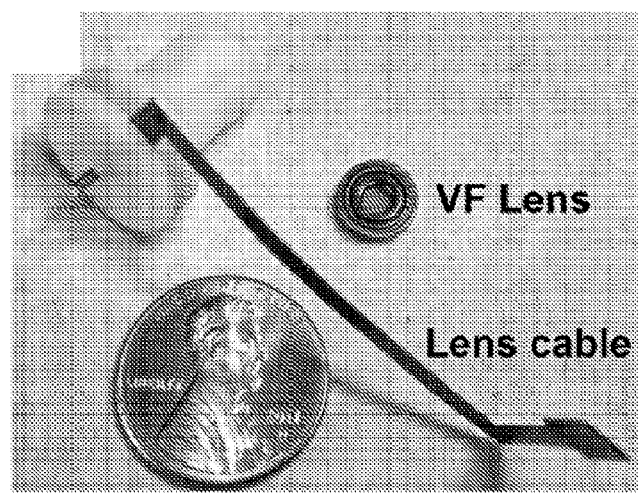

A custom-fabricated two-part plastic adapter was used to interface the focusing optics with the coherent fiber-bundle. The adapter is shown in cross section as a CAD model (dimensions in mm) in FIG. 9. The VF lens assembly was clamped between the top and bottom sections (900 and 905, respectively) of the adapter using an O-ring. The imaging lens (IL) was fit into the top section and the objective lenses (OL) were glued inside 1 mm diameter thin-walled polyimide (PI) tubing. The adapter provided a lightweight and rigid enclosure for the imaging optics that could be surgically implanted on a mouse. The top section was easily detachable and the bottom section was designed with a low profile (<5 mm height) such that it could remain implanted in between experiments for long-term imaging. The imaging lens used for collimation of light was placed inside the adapter at a fixed distance from the end of the fiber-bundle. The VFL and electrode were clamped between the two adapter sections and held in place with an O-ring. The objective lenses were glued with cyanoacrylate adhesive into a variable length (3-7 mm) of polyimide tubing with a 1.06 mm outer diameter, which was then fit into the bottom adapter section. The objective lens assembly could be extended up to 4 mm beyond the device for potential deep-tissue imaging. There was a 40% reduction in field-of-view (FOV) due to off-axis vignetting at the 4 mm implantable length. However, the addition of extra relay lenses in the optics can overcome this reduction in FOV. FIG. 10 shows a photograph of the assembled FCM after being manufactured via a 3D-printing process. The final assembly including the lenses, VFL, and electrode weighs approximately 1.9 g.

Zemax optical design software and experimental testing were used to characterize the performance of the FCM design. For the following results, the objective lenses were fixed at a separation distance of 2 mm from the VFL. With the VFL set to zero optical power, the assembly had a nominal effective focal length of 0.27 mm, numerical aperture (NA) of 0.35, and paraxial magnification of −0.4. Over the full focal range of the VFL, the effective focal range of the FCM was calculated to be ~0.21 to 0.29 mm. The VFL used in the device described here has a speed of ≤20 ms (≥50 Hz) over the full focus range and was also measured from preliminary tests. The 2D lateral images obtained through our FCM are pixelated by the fiber cores. The core-to-core spacing is 4.5 µm, but combined with the nominal 0.4 magnification of the device, the pixels provided a 1.8 µm pixilation of the target sample. The 0.8 mm diameter fiber surface combined with the magnification allows for an imaging field-of-view of 320 µm. When scanning over the focal range of the VFL, the imaging NA of the FCM system ranged from 0.33 to 0.37 and paraxial magnification ranges from −0.38 to −0.44. This minor change in the optical resolution and magnification is insignificant compared to the resolution of the images due to the pixelation of the fiber-bundle.

Figure 11:
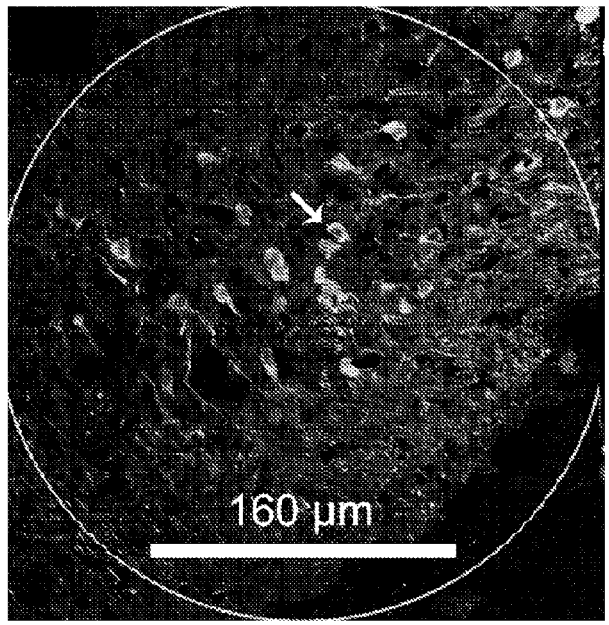
FIGS. 11-13 demonstrate lateral imaging with a device as described herein as compared with a conventional laser-scanning confocal microscope.
Figure 12:
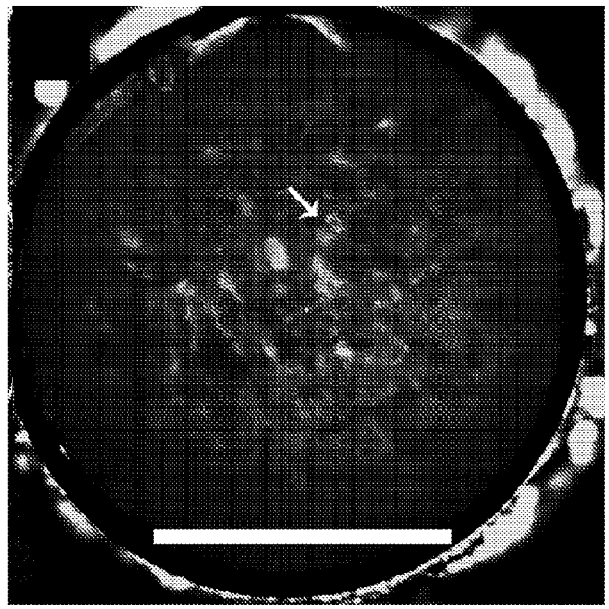
Figure 13:
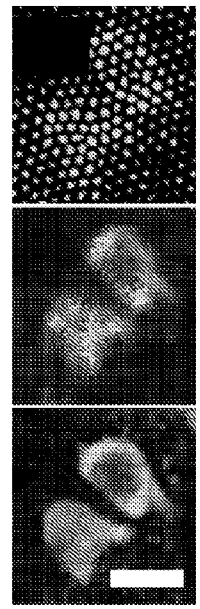

As an initial test of the lateral imaging capabilities, a single focal plane of a 15 µm thick slice of fixed mouse brain tissue was imaged with fluorescent antibody labels (Alexa 488, Invitrogen) for pyramidal neurons in the piriform cortex. The image in FIG. 11 was acquired using a commercial laser-scanning confocal microscope with a 10×, 0.4 NA objective. FIG. 12 shows the same region acquired with our FCM. The latter image was post-processed by band-stop filtering using a spatial Fourier transform to remove the fiber pattern artifact, which is illustrated in FIG. 13. Individual cell bodies and neuronal processes can be resolved in the FCM image, showing that our device can achieve sub-cellular resolution. Further, the measured field-of-view approximates the predicted 320 µm diameter.

Figure 14:
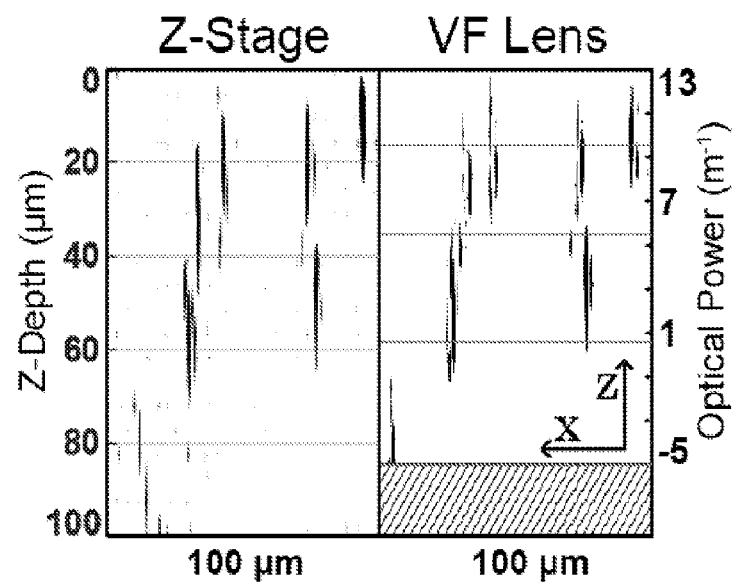
FIGS. 14 and 15 demonstrate the axial scan range of the device.
Figure 15:
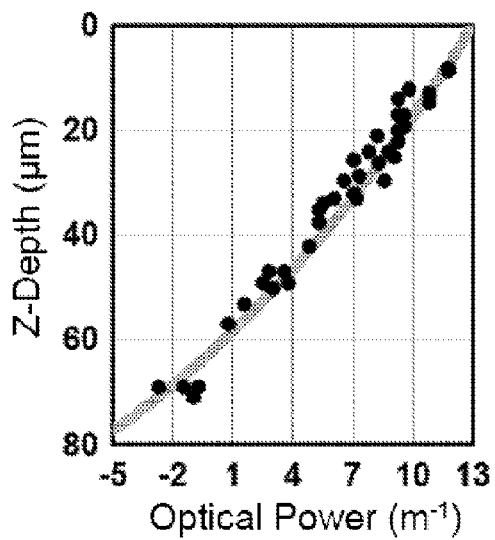

The axial scan range of the device design was determined experimentally. A nanopositioner stage (Mad City Labs, LP100) with 100 µm Z-scan range was used as an axial ruler. A thick test sample consisting of 1 µm diameter red fluorescent beads (Invitrogen, F8887), embedded in agarose solution, and sensitive to 561-nm light, was imaged. Initially, the VFL was fixed at the nearest focal length and obtained axial image sections at 1 µm intervals using the scanning Z-stage. Next, the sample position was fixed, and 36 optical sections of the same regions were obtained by varying the VFL across its full focal range. The left half of FIG. 14 shows an orthogonal projection of several beads imaged while varying the stage position. The right half shows the same region imaged while scanning the full focal range of the VFL. The individual bead axial locations were determined by finding the centroids of their axial profiles. Each bead location was mapped to a VFL focal setting. Data collected from 40 beads agrees with the simulated focal length dependence obtained in the Zemax model of the system [FIG. 15]. Thus, the FCM provides a scan range of approximately 80 µm.

Figure 16:
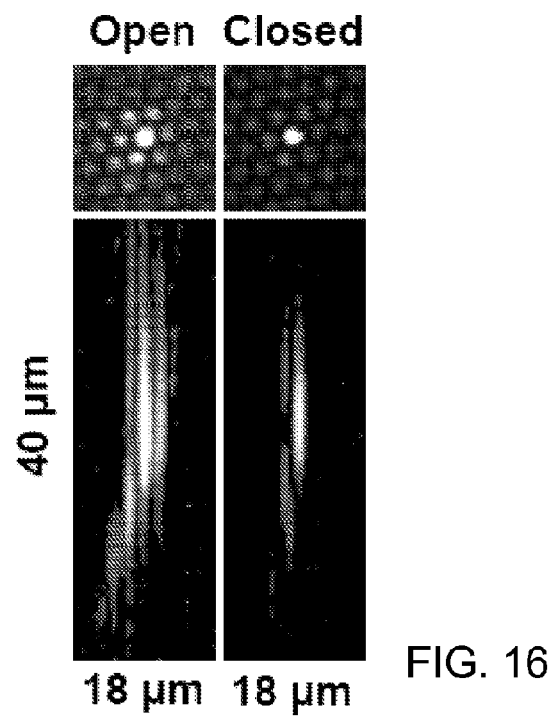
FIGS. 16-18 demonstrate the axial sectioning capability of the device.
Figure 17:
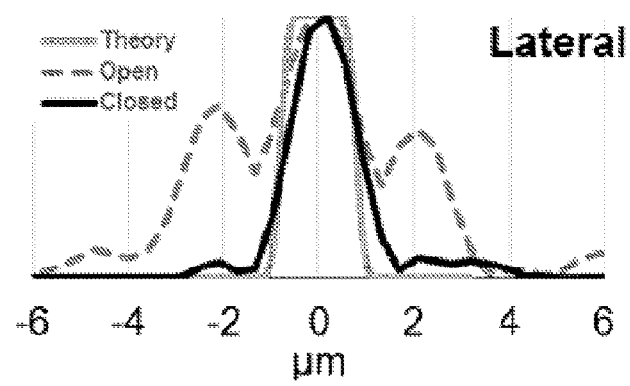
Figure 18:
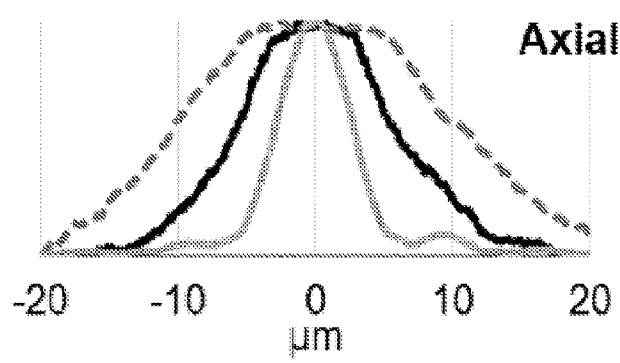

Next, the axial sectioning ability of the FCM was determined experimentally. The confocal pinhole setting on the commercial confocal laser scanning microscope was set to the open position, allowing light emission from multiple fibers, or closed down to a setting of 2 Airy patterns, which allows emission from only one of the fiber cores at a time. FIG. 16 shows the lateral and axial projections of multiple optical sections averaged over several beads for both pinhole configurations. In the lateral projections, out-of-focus fluorescence emission is seen to leak into adjacent fibers when the pinhole is open, but is eliminated with closure of the pinhole [FIG. 17]. The axial resolution also improved from ~22 to ~12 µm full-width-half-maximum (FWHM), as shown in FIG. 18. The theoretical diffraction-limited axial resolution, as determined by Zemax simulations, was ~8 µm FWHM. Differences between the model and experiment can be explained by the multimode nature of fiber cores for the excitation wavelength. The FCM described here uses achromatic optics, which may allow for thinner optical sections due to better focusing of fluorescence emission back into the active fiber core. Thus, the FCM described here can be advantaged over previous systems, using, for example, GRIN lenses.

Figure 19:
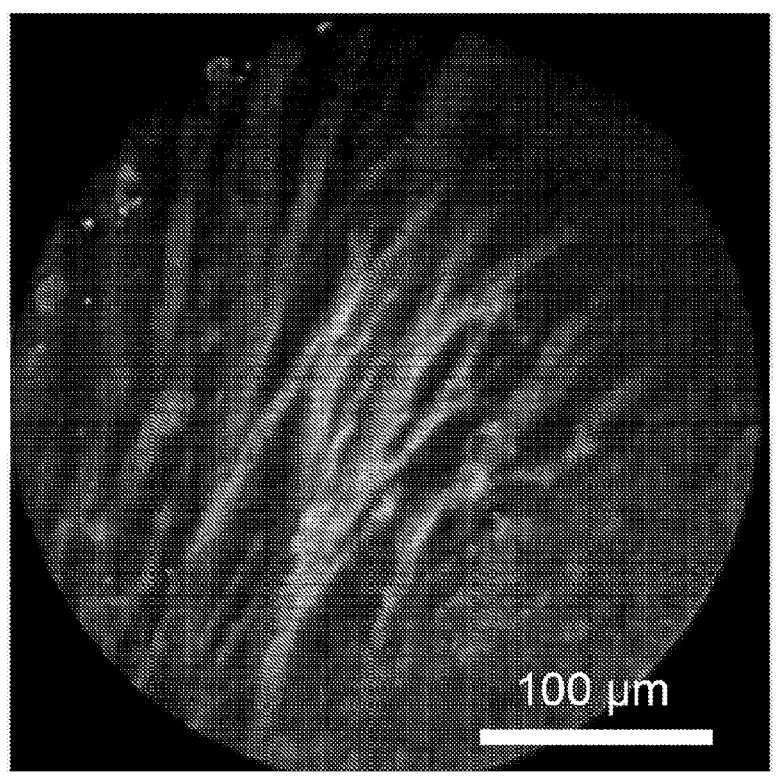
FIGS. 19 and 20 demonstrate 3D imaging of mouse nerve tissue.
Figure 20:
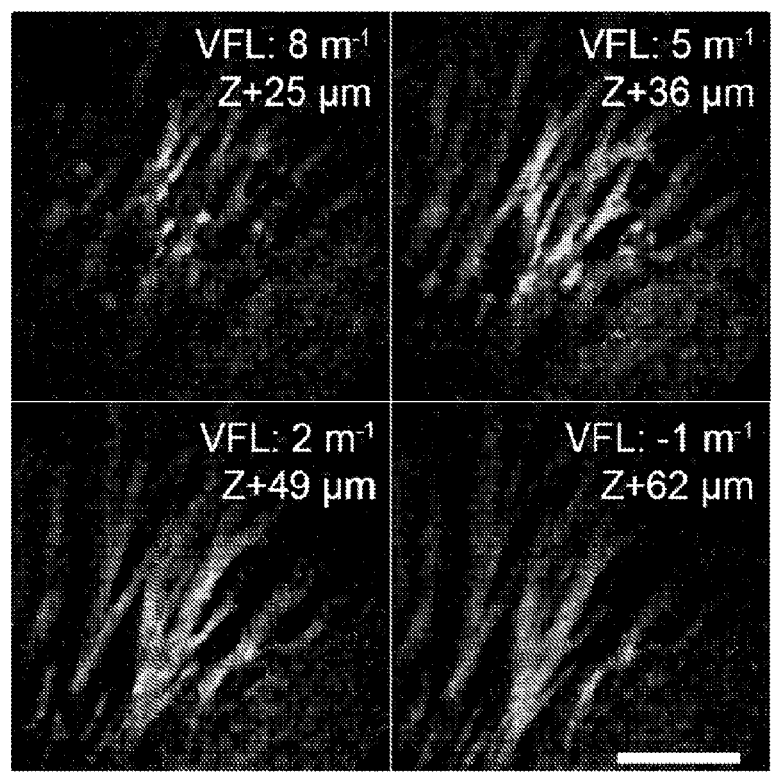

As a first demonstration of the FCM in tissue, intact mouse olfactory nerve fibers expressing yellow-fluorescent protein (YFP) in olfactory sensory neurons were imaged. The mouse was sacrificed by $CO_2$ inhalation, according to existing protocols, and the head was bisected sagittally to expose the surface of the olfactory epithelium and olfactory nerve. The FCM was held in position adjacent to the tissue using a manipulator arm with a saline solution forming an aqueous interface between the objective lens and the tissue. Imaging was performed using a 488 nm CW laser at a resolution of 1024×1024 pixels at 1.7 seconds/frame. 36 image slices were taken while varying the VFL optical power from 13 to −5 $m^{-1}$. The images were post-processed by band-stop filtering as shown in FIG. 13. FIG. 19 shows a maximum-intensity projection of a stack of optical sections. The diameter of each axonal bundle is approximately 10 μm and is easily resolved with the system described here. FIG. 20 shows four separate optical sections spanning ~50 μm. Each of these four images represents a ~12 μm optical section with distinct morphological features, demonstrating efficient optical sectioning with the device described here.

The devices and methods described herein can also be used in imaging the brain, especially for the study of brain activity. Brain activity has been studied using electrodes, functional magnetic resonance imaging, and confocal or two-photon fluorescence microscopy. Implantable electrodes offer the best temporal resolution but are fundamentally limited in the number of neurons that can be accessed and by signal to noise degradation from extracellular fields of nearby neurons. Optical methods based on fluorescence such as confocal microscopy are constrained to very shallow depths by scattering, but can interrogate a wider field of view with more neurons than electrodes. Functional magnetic resonance imaging can provide a study of activity over a large portion of the brain, but the resolution of the technique is not able to study functioning on the single neuron level and is thus limited. Two-photon microscopy has been successful in brain imaging as it allows a larger volume and therefore number of cells to be interrogated, however it is still limited to only studies of regions of the brain near the surface.

The devices and methods described herein can be used in a variety of brain imaging techniques. For example, in certain embodiments, the devices and methods described herein are used in two photon fluorescence imaging of neuron activity by readout of the improved calcium fluorescent indicator (GCaMP6). In other embodiments, Ca2+ imaging is performed using a dual wavelength source to excite the neurons and read out from a fluorescent marker as well as configurations with electrodes and optical imaging to provide spatio-temporal resolution. Structured illumination can provide additional information; this could be achieved with the use of a phase plate before launching into the optical fiber imaging instrument.

Thus, the inventors have demonstrated for the first time that variable focus lens technology can be used in a fiber-coupled miniature confocal microscope to allow full 3D tissue imaging. Demonstrated are a field-of-view of ~320 μm, and ~1.8 and ~12 μm resolution laterally and axially. An axial scan range of up to 80 μm, comparable to that of precision scanning stages, was theoretically and experimentally verified. High resolution three dimensional images of detailed nerve fibers showing axonal networks in the mouse olfactory system were obtained. A simple and lightweight adapter that can be used to combine various components of the optical system for potential animal implantation is also described. The use of this device for long-term imaging of spatially extensive neural networks in deep-brain areas is anticipated. Based on the disclosure herein the FCM described here can be adapted by the person of ordinary skill in the art for multiphoton imaging of fluorescent sensors or intrinsic signals from biological tissue.

Lung Imaging Via Fiber-Coupled Endoscopy

Figure 21:
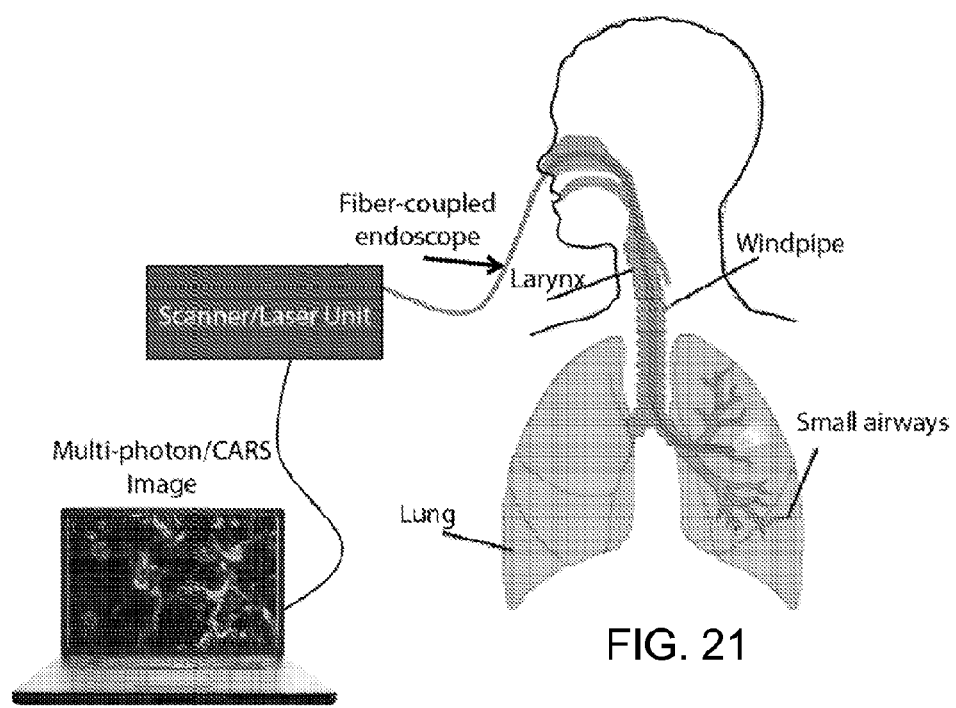
FIG. 21 is a schematic of a lung imaging system and method. A pulsed laser system with variable wavelength (ranging from 700-1100 nm) or pulsed laser system with multiple wavelength outputs generates pulses (e.g., synchronized picosecond pulses at 816 and 1064 nm) to excite unlabeled tissue in vivo or excite fluorescent markers. This is delivered to the patient through a fiber-coupled endoscope containing variable lenses and prisms. The 3D multiphoton images are collected and used for diagnosis and treatment of lung disease.

1. Overview 1.1 Objectives and Significance:

Deployment-related lung disease, or respiratory disease in military personnel returning from Iraq and Afghanistan, is becoming an increasingly serious problem. The incidence of asthma, bronchiolitis, and other severe respiratory diseases in veterans returning from Afghanistan and Iraq is double the rate of veterans returning from other countries. Surgical biopsy is currently used to diagnose veterans suffering from severe lung-related complaints, but is invasive and potentially debilitating. The present disclosure provides a non-invasive alternative: a novel compact and portable multiphoton coherent anti-Stokes Raman microscopy (CARS) system using a compact endoscope and a source based on diode lasers. The system can be suitable for use in the field as well as the clinic. The system can allow for microscale in vivo imaging of tissue with chemical specificity. Moreover, the novel imaging endoscope design need not include moving parts, in that it is based on an integrated electrowetting lens element whose focal length and position (i.e., via angular shift) can be tuned with an applied voltage. The general concept is shown in FIG. 21.

CARS is a coherent form of Raman (vibrational) spectroscopy that allows imaging of specific vibrational modes of compounds. Different modes can be excited by tuning the input laser frequencies allowing chemical specificity. In addition to the CARS signal, two-photon autofluorescence (generated by elastin, NAD(P)H, FAD) and second harmonic (collagen, extracellular matrix) signals are also generated by the same excitation laser. The resulting images contain detailed information on the structure and disease state of the tissue, for example, the degree of inflammation can be observed by the amount of autofluorescence of NAD(P)H and fibrosis by second harmonic signal from collagen, and lipids and cell membranes by CARS.

A CARS signal can be generated by two synchronized picosecond pulse lasers operating at different wavelengths. Current state-of-the-art sources include Ti:Sapphire lasers and optical parametric oscillators, which can easily cover an entire 50 $ft^2$ optical table. In contrast, we describe a compact laser source based on electrically-pumped diode lasers. In such a source, two continuous wave lasers are passed through a series of amplitude and phase modulators to generate chirped pulses. The pulses are compressed with a dispersion compensation stage. The use of laser diodes allows large tunability across the region of interest, as well as a path to a compact package powered with batteries (important for use in the field). A common RF input to the modulators for the two lasers ensures that the pulses are synchronized.

This laser source can be used in conjunction with the devices described herein, for example, to provide a novel endoscope that contains an electrical tunable lens element to enable lateral and depth scanning without moving parts. The endoscope can include fiber guide that is imaged onto the sample using a combination of fixed and variable electrowetting-based lenses, with chromatic aberration compensation. Through integration of fixed lens elements with a variable focus electrowetting lens, an endoscope capable of lateral and depth scanning without moving parts can be realized.

2. Introduction and Background 2.1 Deployment-Related Lung Disease:

Approximately 2 million US military men and women have deployed to Iraq or Afghanistan since 2001. There is increasing evidence that those personnel are at higher risk for developing disabling chronic lung diseases, termed deployment-related lung disease (DRLD), including acute respiratory illness, chronic asthma and constrictive bronchiolitis (CB). These illnesses are of great concern because of possible long-term health consequences for veterans as well as immediate impacts on troop readiness. While the environmental causes of these diseases are being explored, there is an immediate need for improvements in the diagnosis and treatment of these military personnel.

Pulmonary function testing and high resolution chest CT scanning are neither sensitive nor specific in diagnosing the causes of deployers' chest symptoms. Consequently, many of the military men and women undergoing evaluation for DRLD symptoms require surgical lung biopsy, an invasive and potentially risky procedure. After the biopsy is performed, the sample is analyzed by a pathologist using standard histopathology techniques. Analysis of the structure of the tissue can be used to determine for example the degree of fibrosis or constriction of the small airway (bronchiole) to diagnose CB.

This disclosure describes a new, non-invasive clinical endoscopic technology based on multi-photon and coherent anti-Stokes Raman scattering microscopy to eliminate the need for surgical biopsy in DRLD. With this instrument, multi-photon and CARS imaging of the lung tissue can be done non-invasively to provide detailed information on the lung tissue structures in situ as well as providing functional information not possible with standard histopathology. Because the instrument is non-invasive, it can be used for repeated monitoring of the patient in order to determine changes in the lung tissue in response to treatments. The ability to obtain detailed structural and function information throughout the patient treatment process would revolutionize patient care and development of better methods to treat DRLD.

2.2 Multi-Photon Microscopy:

Multi-photon microscopy (MPM) has found increasing use in laboratory-based biomedical imaging due to its sub-cellular resolution along with the ability to obtain structural and functional information. These properties make MPM unique compared to other imaging modalities such as ultrasound, magnetic resonance imaging (MRI), or X-ray/computed tomography (X-ray CT) imaging. However, MPM suffers from limited tissue penetration depth and necessitates complex laser sources, as it relies on nonlinear optical processes. The development of a compact MPM diode laser source and fiber-based endoscope for multi-photon imaging increases the potential applications for diagnosis and monitoring, both in the clinic and in the field.

MPM is an imaging method based on non-linear optical response of a medium. Since the probability of simultaneous interactions with two (or more) photons is low (cross-sections ~$10^{-50}$ cm$^4$ s or 1 GM), the process only occurs when there is high photon flux (~$10^6$-$10^8$ W/cm$^2$). This is typically achieved using a pulsed near-infrared laser focused with a high numerical aperture objective.

As a result, MPM offers intrinsic axial cross sectioning because the process only occurs at the focus of the microscope objective. The technique offers equivalent resolution to confocal microscopy (~200 nm lateral and ~800 nm axial) but does not require a pinhole. It is important to realize that MPM can provide contrast without exogenous dye labeling and is a completely non-invasive technique.

Figure 22:
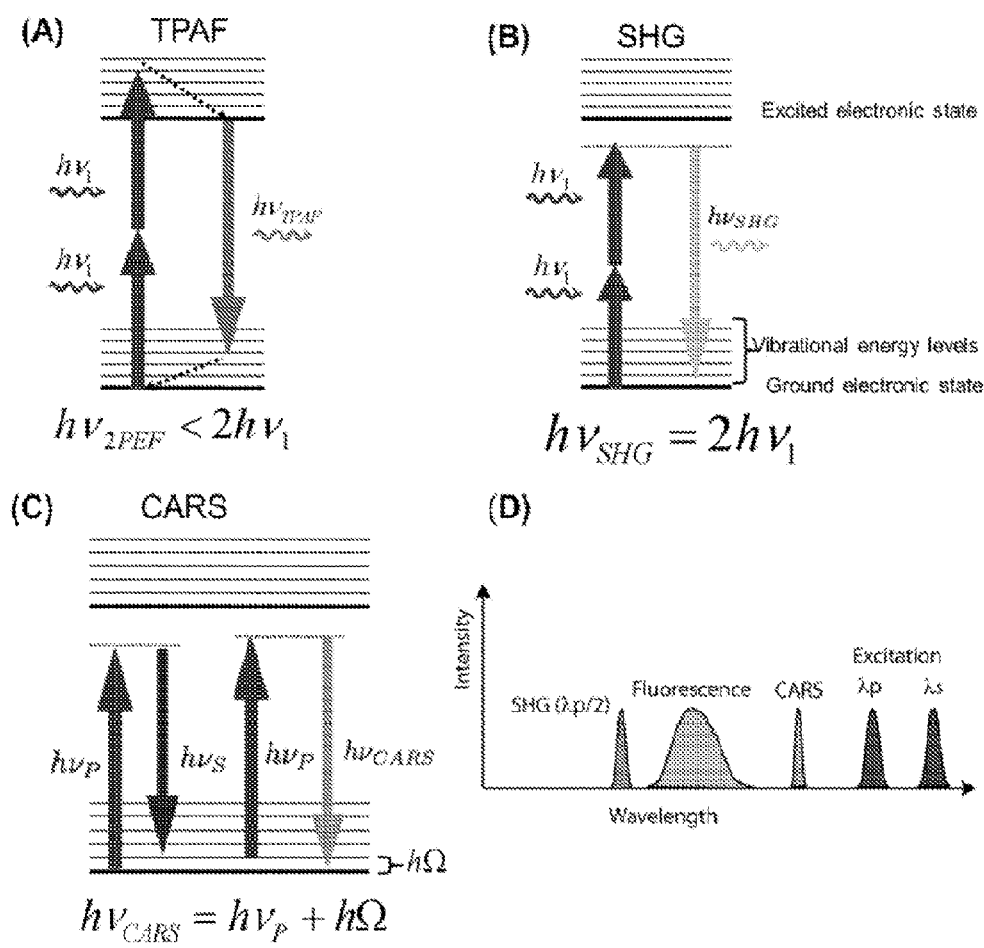
FIG. 22 provides Jablonski diagrams showing the interaction of multiple infrared photons with a molecule. (A) In two-photon excitation autofluorescence (TPAF) the molecule absorbs two infrared photons and after relaxation, the molecule emits a lower energy photon. (B) In second harmonic generation (SHG), two infrared photons are instantaneously up-converted to a single photon of twice the energy. (C) In Coherent Anti-Stokes Raman Scattering (CARS), two photons with energies $hv_p$ and $hv_s$ coherently excite the vibrational level with energy $h\Omega=hv_p-hv_s$. An additional photon, $hv_p$, interacts with the vibrationally excited molecule emitting a photon with energy given by the original incident photon energy plus the vibrational energy, $hv_{CARS}=hv_p+h\Omega$, leaving the molecule in its original ground state. (D) The resulting signals are emitted at different wavelengths and by spectral filtering the emission, can be simultaneously detected.

MPM includes two-photon excitation fluorescence (TPEF), second harmonic generation (SHG), and coherent anti-stokes Raman scattering (CARS). FIG. 22 shows a schematic of these different processes that result from non-linear multi-photon interactions with a molecule. TPEF is very similar to traditional fluorescence, except two photons of a lower energy are simultaneously absorbed to excite a fluorophore (molecule that absorbs photons and re-emits a red-shifted wavelength). When TPEF is used to excite endogenous fluorophores such as elastin and NAD(P)H, it is called two-photon excitation autofluorescence (TPAF). Another nonlinear process that occurs with two-photon excitation is second harmonic generation (SHG). The SHG process involves the simultaneous up-conversion of two lower-energy photons as a single photon of twice the energy.

CARS is a coherent form of Raman (vibrational) spectroscopy that allows imaging of specific vibrational modes of compounds by exciting the sample with two synchronized near infrared lasers at different wavelengths. The CARS signal is proportional to the square of the concentration of vibrational oscillators. Distinct vibrational modes of the sample are excited resonantly by tuning the laser frequencies, and the signal can be enhanced by as much as 106 compared with conventional Raman scattering. CARS is useful for imaging lipids in biological samples using excitation wavelengths of 816 nm and 1064 nm to excite the CH2 stretch at 2850 cm−1. CARS imaging has also been demonstrated for DNA and protein. In addition to a resonance vibrational signal, the excitation of the sample by pulsed infrared light can also generate a non-resonant background due to the electronic response of the sample. The non-resonant background can be minimized by choosing a pulse length that balances the need for high peak intensity with a narrow spectrum that will predominately excite the vibrational resonance of interest and not contribute to the non-resonant background. An optimal pulse duration satisfying these requirements is ~3 ps, corresponding to a spectral bandwidth of ~3-5 cm$^{-1}$.

2.3 Laser Sources for CARS:

In many applications, CARS requires two different wavelength, synchronized picosecond lasers, in the visible/near-infrared region to minimize tissue absorption and scattering. One of the wavelengths is desirably tunable to allow for matching of molecular vibrations. In addition, the pulses from the two lasers should be temporally overlapped and the spectral bandwidth should be smaller than the bandwidth of the Raman resonances.

To detect lipid signatures needed for disease diagnosis using CARS, and additional excitation of two-photon autofluorescence and second harmonic generation, a system as described herein can include 816 and 1064 nm pulsed lasers. Described herein is a system based on two continuous-wave electrically-pumped diode lasers. To the best of our knowledge, there has not been a demonstration of CARS using an all-diode-based laser system. Picosecond lasers can be used to minimize the non-resonant background, with narrow bandwidth and peak power suitable for CARS. Since CARS is inherently a nonlinear process, any background between the pulses should be automatically filtered out.

Current, state-of-the-art CARS systems rely on bulky Ti:Sapphire lasers, optical parametric oscillators (OPOs), two mode-locked lasers with an phase-locked loop (PLL), and two-color sources based on fiber lasers and nonlinear frequency broadening or shifting. A natural method to achieve two-color, synchronized operation is offered by OPOs. OPOs suffer from similar issues to that of the Ti:Sapphire: complexity, optical pumping, inefficiency, and lack of a compact footprint. While fiber lasers offer an attractive alternative, Er and Yb rare-earth doped lasers operate at 1030 nm and 1550 nm respectively. They do not offer a solution for 800 nm sources without nonlinear frequency conversion. While successful, nonlinear optical techniques used to generate one or both of CARS wavelengths are extremely sensitive to intensity fluctuations.

Figure 23:
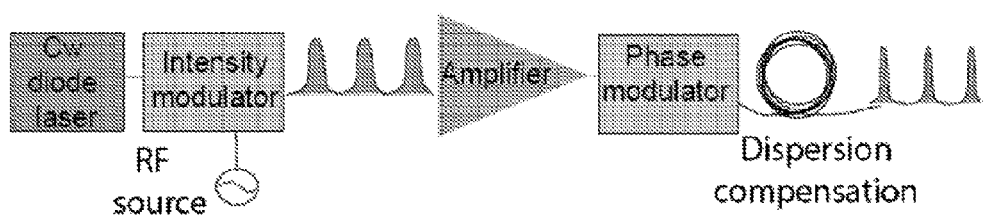
FIG. 23 is a schematic view of a time-lens source according to one embodiment of the invention. The source includes a continuous wave diode laser, intensity modulator, amplifier, phase modulator, and dispersion compensation. The intensity modulator carves out pulses, the amplifier compensates for modulator loss, the phase modulator adds chirp, and the dispersion compensation consisting of fiber or gratings compresses the pulses.

One embodiment of a radiation source is a so-called "time-lens" source, shown in schematic view in FIG. 23. The source with a continuous-wave single-mode diode laser and an amplitude modulator that is used to carve pulses from each diode. Following the amplitude modulator, a phase modulator imposes a temporal quadratic phase modulation which broadens the spectrum of the input light, producing the bandwidth needed for a short pulse. The repetition rate and pulse width of the source are not constrained, as in a mode-locked laser, by the gain-bandwidth and cavity length of the laser. Instead, the pulse width will be determined by the amount of chirp and dispersion compensation applied to the pulse, and the repetition rate will be determined by the electrical drive signal to the modulators. This allows time-lens sources to be easily synchronized to another mode-locked laser or to an additional time-lens source.

Continuous-wave, single-mode electrically-pumped diode lasers are a versatile, compact and efficient light source. They are available at wavelengths ranging from the visible to infrared and have been demonstrated with electrical-to-optical efficiencies of greater than 75%. Picosecond and femtosecond pulses can be generated from diode lasers with the time-lens concept. Additionally, the loss of the modulators can be compensated for tapered diode amplifiers. The extinction ratio between pulse to background depends on the extinction ratio of the modulator used (typical 20-40 dB). Although CARS sources do not have perfect extinction between the pulses compared with a mode locked laser, the nonlinear nature of CARS will filter out the continuous-wave background. The continuous-wave background can cause a temperature change in the sample, but we have calculated this to be negligible. Assuming 25% of the energy of a 3 nJ pulsed laser in the background, a 0.0021 C temperature rise is predicted. The person of ordinary skill in the art will refer further to the following references for information regarding the "time lens" sources described herein: D. H. Broaddus, M. A. Foster, A. C. Turner-Foster, K. W. Koch, M. Lipson, and A. L. Gaeta, "Temporal-imaging system with simple external-clock triggering," Optics Express 18, 14262-14269 (2010); Z. Jiang, D. E. Leaird, and A. M. Weiner, "Optical processing based on spectral line-by-line pulse shaping on a phase-modulated CW laser," IEEE Journal of Quantum Electronics 42, 657-665 (2006); B. E. Kolner, "Active pulse-compression using an integrated electro-optic phase modulator," Applied Physics Letters 52, 1122-1124 (1998); P. Crump, W. Dong, S. Zhang, M. Grimshaw, M. Defranza, S. Elim, D. Wise, G. Kuang, W. Guoki, J. Wang, das S., J. Farmer, and M. Devito, ">76% cw wall-plug efficiency at high powers from 0.98-mm emitting laser diodes: Sheds shows route to 1 kW cw diode laser bar," SPIE 201-206 (2005); J. van Howe, J. H. Lee, and C. Xu, "Generation of 3.5 nJ femtosecond pulses from a continuous-wave laser without mode locking," Optics Letters 32, 1408-1410 (2007), each of which is hereby incorporated herein by reference in its entirety.

2.4 Endoscope with Electrowetting Technology 2.4.1 Endoscope Optical Design:

Optical endoscope technology enables non-invasive in vivo imaging of internal tissues. The proposed research will utilize an endoscope with no moving parts for non-invasive imaging of lung tissue. Typical optical endoscopes contain fiber for delivery of the excitation and emission light, focusing optics, and mechanical scanners.

Lateral scanning endoscopy has been demonstrated using coherent fiber bundles where the scanning mechanism is located at the proximal end of the fiber. The drawback to using a fiber bundle is the pixelation and limitation in resolution of the acquired image and potential for cross-talk between fibers. Alternatively, lateral scanning can be done at the distal end of the fiber relay within the endoscope head. Unfortunately, this design increases the size of the endoscope head needed to fit the scanner. Several recent demonstrations have utilized resonance scanning of a double-clad fiber tip with piezo electric elements. Here, the excitation light is delivered through the core of the fiber and emission coupled back through the core and inner cladding. Drawbacks of the scheme include limited collection efficiency and sensitivity due to the return numerical aperture, and the large size of the endoscope head.

The present disclosure provides a novel endoscope design that will be the first to utilize state-of-the-art electrowetting lens technology. Certain aspects of the disclosure relate to a 1-mm diameter head with improved detection sensitivity, due to the unique arrangement of our fiber bundle. An electrowetting lens element will be included to provide for axial and lateral scanning, greatly reducing the size requirements. In comparison to piezo scanning elements, the electrowetting lenses have no moving parts and have been demonstrated to operate with low (<10V) voltages. Because the actual fiber tip need not be scanned when using the presently-described devices, it is thus possible to include multiple multimode collection fibers to the fiber bundle and greatly increase the detection efficiency of the emitted signal.

Figure 24:
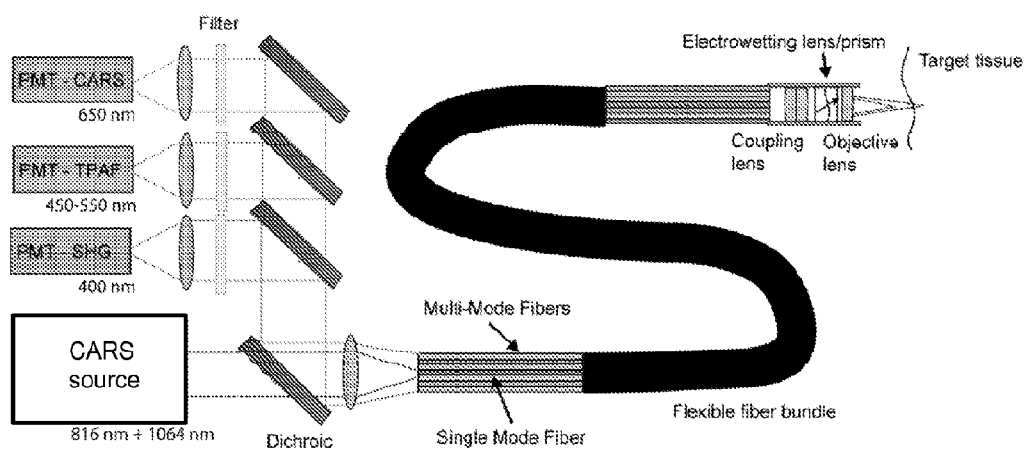
FIG. 24 is a diagram of variable lens assembly system used in multiphoton endoscopy for medical imaging. The fiber bundle consists of a single mode fiber for coupling excitation light surrounded by multimode fibers for optimal collection of emission light; a dual-cladding fiber can alternatively be used instead of the fiber bundle, as described in detail below. The emission light is spectrally separated and detected on three photodetectors for CARS, TPAF, and SHG signals. The imaging device end consists of focusing optics, an electrowetting lens/prism scanner for lateral and axial scanning of the excitation light.

The increased miniaturization and detection sensitivity will allow the devices described herein to be readily utilized for a variety of clinical applications where non-invasive imaging is desired. One particular embodiment of an endoscope system is shown in FIG. 24. The endoscope of FIG. 24 includes an electrically tunable lens-prism element (i.e., an electrowetting lens element as otherwise described herein) to enable lateral and depth scanning without moving parts, with ~100 microns of depth resolution and ~200 microns of lateral resolution. The electrically tunable optical elements are based on the principle of electrowetting, which can be used to tune the curvature and slope of liquid-liquid interfaces with an applied voltage.

2.4.2 Principles of Electrowetting:

Electrowetting lenses and prisms are an essential part of the endoscope, allowing for a system without moving parts. Basic principles can be used to determine the relationship between applied voltage and droplet curvature. The contact angles of a small liquid droplet on an insulated metallic substrate will be determined by the balance in surface tension at each interface: substrate/liquid, substrate/surrounding medium, and liquid/surrounding medium. The effect of an applied voltage to the liquid and the substrate on the contact angle of the droplet on a dielectric surface is given by:

$$\gamma_{SL} = \gamma_o - \frac{1}{2}\frac{\varepsilon\varepsilon_o}{d}V^2$$

where S represents the substrate, L represents the liquid, $\gamma_o$ is the surface tension without an applied voltage, $\varepsilon$ is the permittivity of the dielectric layer, $\varepsilon_o$ is the permittivity of vacuum, d is the thickness of the dielectric layer, and V is the voltage across the dielectric layer. The expression for the contact angle is given by the Lippman-Young equation:

$$\cos\theta = \cos\theta_o + \frac{1}{2}\frac{\varepsilon\varepsilon_o}{2\gamma_{LG}d}V^2$$

where $\theta_o$ is the contact angle of the droplet without any applied voltage. The contact angle sensitivity to voltage can be enhanced with the insertion of a hydrophobic layer between a conductive liquid and the electrode (reduces $\gamma_{LG}$) and with a thinner dielectric layer (reduces c).

Figure 4:
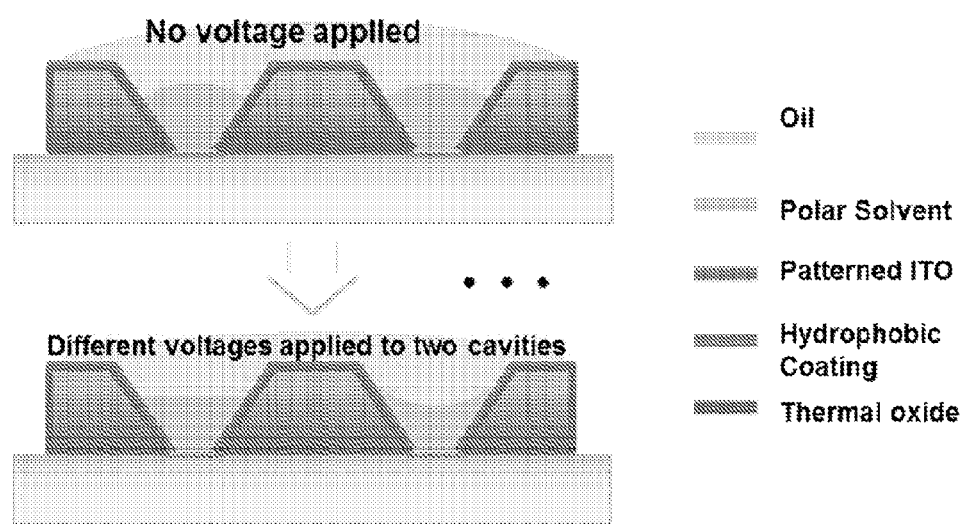
FIG. 4 is a schematic cross-sectional view of the operation of an electrowetting lens element according to one embodiment of the disclosure.

2.4.3 Advantages of Electrowetting Devices:

The electrowetting lens elements described herein are based on electrowetting. Operation is illustrated in FIG. 4. An applied voltage determines the contact angle of the polar liquid to the side walls, allowing variable focal lengths. As described above, variable focal position (i.e., transverse to the optical axis) devices are also be made through the provision of separately-addressable electrodes; such devices are also known here as lens-prisms. Electrowetting devices have a number of attractive features including transmissive geometry, small size, low operating voltages, fast response time, low insertion losses, polarization insensitivity, large stroke and good optical quality. These favorable properties make them a more versatile solution than technologies such as spatial light modulators, micro-electro-mechanical segmented (MEMS) and deformable mirror systems, piezo-actuated deformable mirrors, and flexible membrane liquid lenses.

The electrowetting lens elements described herein can be fabricated using atomic layer deposition (ALD), which enables conformal films with atomic level thickness control. The ALD technique is based on sequential, self-limiting reactions between gas-phase precursors and the initial substrate. At each surface reaction, monolayers of surface species are deposited and Angstrom level thickness control is achieved. Conformal, high-quality, pinhole-free films can be fabricated. Due to the nature of the process; gas-phase precursors react with the substrate until the reaction reaches completion and no unreacted substrate areas remain. ALD has been demonstrated with dielectric and hydrophobic layers, both important for electrowetting devices. The ALD of dielectric materials, such as $Al_2O_3$, yields insulating films with extremely low leakage currents. The technique is currently used to deposit the high k dielectric films on silicon to fabricate MOSFETs. Additionally, ALD can be used to deposit an $Al_2O_3$ adhesion layer for subsequent surface functionalization for hydrophobic layers in MEMs devices.

3. Technical Approach 3.1 Study of Lung Disease with Multi-Photon/CARS Microscopy:

Multi-photon and coherent anti-Stokes Raman scattering (CARS) microscopy of the lung can provide detailed information on the disease state of the lung tissue in vivo without an invasive surgical biopsy. Mouse models of acute lung injury, pulmonary inflammation, and fibrosis can be used to further develop the devices and methods described herein, for example, by imaging of lung tissue for different mouse models ex vivo using a multiphoton/CARS microscope. The acquired CARS, TPAF, and SHG images can be analyzed and correlated with known disease pathophysiology and parallel histology. In vivo imaging in the lung of anesthetized mice can then be performed using the devices and methods described herein, and the images acquired in vivo can be compared with images done ex vivo using the CARS/multiphoton microscope.

3.1.1 Mouse Models: Acute Lung Injury (ALI), Pulmonary Inflammation and Fibrosis:

To investigate the pathogenesis of ALI, pulmonary inflammation and fibrosis, researchers have developed multiple models using small animals, including i) ventilator-induced lung injury (VILI), in which animals are exposed to high-pressure mechanical ventilation, that results in acute respiratory failure within hours, ii) lipopolysaccharide (LPS)-induced lung injury, in which animals are exposed to bacterial cell wall products, to induce a profound, yet resolving pulmonary inflammation, and iii) bleomycin-induced pulmonary fibrosis, in which animals are repetitively exposed to bleomycin, to induce a progressive pulmonary fibrosis. These models are standard models of ALI, pulmonary inflammation, and pulmonary fibrosis in the field and their reliability and track record of publications on these models provide a strong foundation on which to base new imaging modalities to investigate the outcome of pulmonary disease. IACUC protocol #: B-100312(11)1D) is an approved animal protocol for the work described here.

Figure 25:
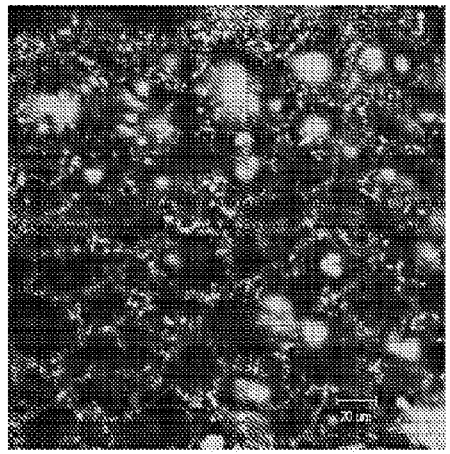
FIGS. 25-27 are CARS and multiphoton images of 2-day lipopolysaccharide (LPS) exposed (FIG. 25) and control mouse lung (FIGS. 26 and 27) showing autofluorescence signal predominately from nicotinamide adenine dinucleotide (phosphate) (NAD(P)H) and elastin (bulk of signal in FIG. 25; marked in FIG. 27), second harmonic signal from collagen (marked in FIG. 26), and CARS signal from lipid content in cell membranes and droplets (marked in FIG. 27).
Figure 26:
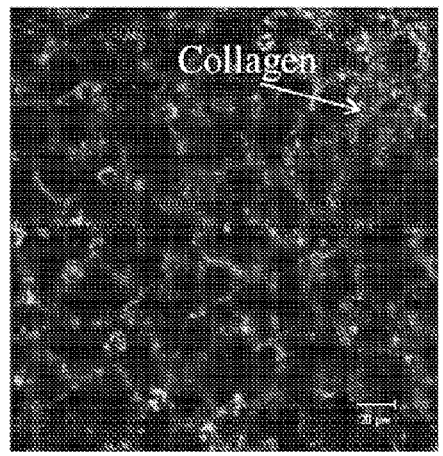
Figure 27:
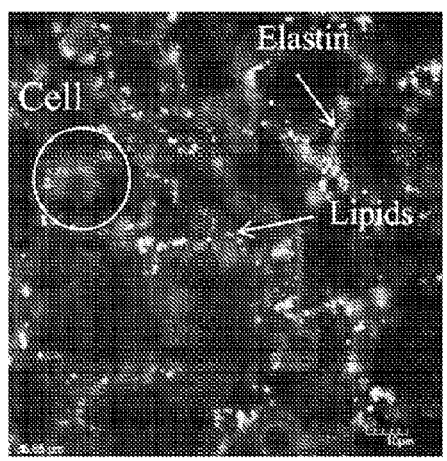

3.1.2 Multi-Photon/CARS Imaging:

To demonstrate the ability of multi-photon/CARS microscopy to characterize lung disease, we performed measurements on models for pulmonary inflammation. Imaging was done to compare a normal mouse lung (control) with the lung of a mouse exposed to Lipopolysaccharide (LPS) for 2 days prior to imaging causing acute inflammation. CARS, TPAF, and SHG imaging was performed on fresh lung sections after perfusion, without processing, shown in FIG. 25. Inflammatory response of the LPS exposed is clearly observed as a large increase in autofluorescence signal [FIG. 25] in comparison with the control [FIG. 26]. We believe the autofluorescence signal is predominately from NAD(P)H, an endogenous fluorophore. Alterations in cellular metabolic pathways in response to inflammation converts non-fluorescent NAD(P)+ to fluorescent NAD(P)H thereby causing the signal increase. FIG. 27 shows an example CARS signal from a control lung. Here, the lipids present inside cells and as a part of cell membranes are observed and provide label-free contrast for imaging these cellular structures. SHG signals occur predominately from collagen in the tissue. For fibrosis lung models, SHG imaging can measure the amount of collagen present as has been demonstrated in a recent study. Image analysis software in Matlab will be developed to further assist in characterizing different disease models. For example, analysis of the total amount of collagen and size of the small airways to characterize fibrosis and amount of NAD(P)H autofluorescence to characterize degree of inflammation will be performed.

Figure 28:
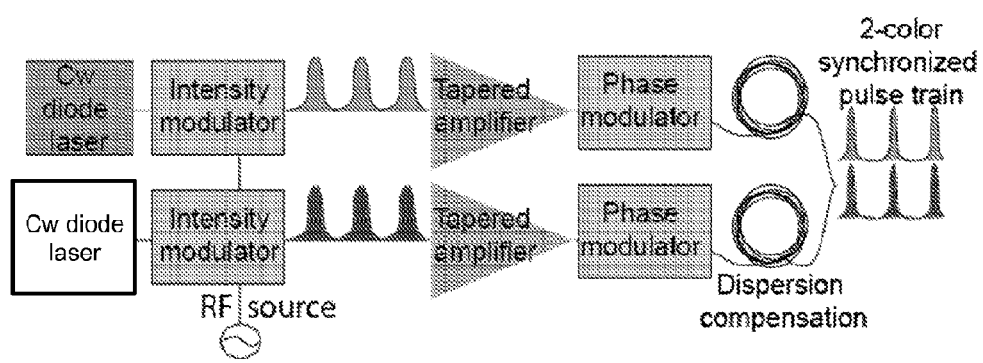
FIG. 28 is a schematic view of a time lens source according to one embodiment of the invention. The source consists of two continuous wave diode lasers operating at 816 and 1064 nm in Littrow cavities. These diodes are followed by intensity modulators, which carve out the pulses. An amplification stage consisting of tapered diode amplifiers compensates for the insertion loss of the modulators. A phase modulator adds frequency components to the pulses, which are then compressed in a fiber-based dispersion compensation stage.

3.2 Diode-based CARS source: As described above, the disclosure relates to a diode-based CARS source. A time lens source according to one embodiment of the disclosure operates at 816 and 1064 nm using commercially available single-mode laser diodes placed in external cavities. One embodiment is shown in schematic view in FIG. 28. After the laser diodes, two amplitude modulators are used to generate the initial pulse trains. These are followed by diode amplifiers that can output up to 2 W single mode, using a tapered device design. As the pulses entering the amplifiers are long, no nonlinear effects are expected. Two phase modulators, driven by a common RF source, will follow the tapered amplifiers, to provide a 2-color synchronized pulse train at the output. Dispersion compensation is provided by gratings, which compresses the pulses to a few picoseconds. The pulses are coupled into optical fiber to allow for ease of use. The lasers can be characterized for pulse length, output power, pulse to pulse stability and finally, noise.

The overall system efficiency is dictated by the insertion loss of the modulators (typically 3-4 dB per modulator). To combat this loss, another embodiment of the disclosure provides a source that uses cross phase modulation instead of the phase modulators. In such a device, the compressed 816 nm pulses are sent through a nonlinear fiber, along with the continuous-wave signal at 1064 nm. The zero dispersion of the nonlinear fiber will be chosen to match the group velocities of the 816 nm and 1064 nm pulses. Cross-phase modulation-induced modulation instability will generate pulses at 1064 nm corresponding to the repetition rate of the 816 nm laser. Finally, the 1064 nm pulses will be compressed using a grating compressor or fiber dispersion compensation stage.

Figure 29:
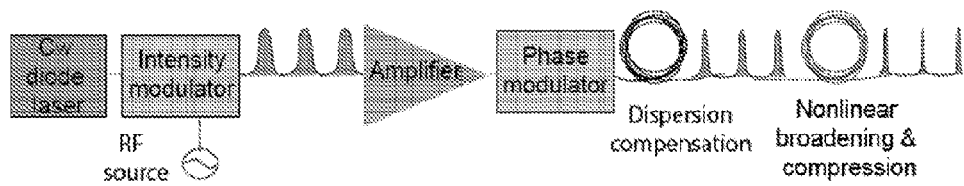
FIG. 29 is a schematic view of a time lens source including nonlinear broadening for additional pulse shortening. The source includes of a continuous-wave diode laser, intensity modulator, amplifier, phase modulator, and dispersion compensation. The intensity modulator carves out pulses, the amplifier compensates for modulator loss, the phase modulator adds chirp, and the dispersion compensation consisting of fiber or gratings compresses the pulses. This is followed by a second stage that includes fiber for nonlinear spectral broadening and compression. The second stage allows for further pulse shortening without the addition of another phase modulator.

In another embodiment, a nonlinear broadening/compression stage is included after the dispersion compensation stage. Such a device is shown in FIG. 29. The source consists of a cw single-mode diode laser and an amplitude modulator that is used to carve pulses. Following the amplitude modulator, a phase modulator imposes a temporal quadratic phase modulation which broadens the spectrum of the input light, producing the bandwidth needed for a short pulse. A dispersion compensation section to compress the pulses is followed by an additional stage of nonlinear broadening (self-phase modulation, four-wave mixing) and compression to further shorten the pulse without the use of an additional phase modulator. By seeding the second stage with a cw laser, cascaded four wave mixing can be used to broaden the spectrum. The repetition rate and pulse width of the source are not constrained, as in a mode-locked laser, by the gain-bandwidth and cavity length of the laser. Instead, the pulse width will be determined by the amount of chirp and dispersion compensation applied to the pulse, and the repetition rate will be determined by the electrical drive signal to the modulators. This allows time-lens sources to be easily synchronized to another laser or an additional time-lens source. Continuous wave, single-mode electrically-pumped diode lasers are a versatile, compact and efficient light source. They are available at wavelengths ranging from the visible to infrared and have been demonstrated with electrical-to-optical efficiencies of greater than 75%. Picosecond and femtosecond pulses can be generated from diode lasers with the time-lens concept. Additionally, the loss of the modulators can be compensated for tapered diode amplifiers. The extinction ratio between pulse to background depends on the extinction ratio of the modulator used (typical 20-40 dB). Although time lens sources do not have perfect extinction between the pulses compared with a mode locked laser, the nonlinear broadening will filter out the cw background. The cw background can cause a temperature change in the sample, but we have calculated this to be negligible. Assuming 25% of the energy of a 3 nJ pulsed laser in the background, a 0.0021 C temperature rise is predicted. Further information is provided in D. H. Broaddus, M. A. Foster, A. C. Turner-Foster, K. W. Koch, M. Lipson, and A. L. Gaeta, "Temporal-imaging system with simple external-clock triggering," Optics Express 18, 14262-14269 (2010). Z. Jiang, D. E. Leaird, and A. M. Weiner, "Optical processing based on spectral line-by-line pulse shaping on a phase-modulated CW laser," IEEE Journal of Quantum Electronics 42, 657-665 (2006). B. E. Kolner, "Active pulse-compression using an integrated electro-optic phase modulator," Applied Physics Letters 52, 1122-1124 (1998). P. Crump, W. Dong, S. Zhang, M. Grimshaw, M. Defranza, S. Elim, D. Wise, G. Kuang, W. Guoki, J. Wang, das S., J. Farmer, and M. Devito, ">76% cw wall-plug efficiency at high powers from 0.98-mm emitting laser diodes: Sheds shows route to 1 kW cw diode laser bar," SPIE 201-206 (2005). J. van Howe, J. H. Lee, and C. Xu, "Generation of 3.5 nJ femtosecond pulses from a continuous-wave laser without mode locking," Optics Letters 32, 1408-1410 (2007), each of which is hereby incorporated herein by reference in its entirety.

3.3 Endoscope 3.3.1 Endoscope Optical Design:

A device according to one embodiment of the disclosure is shown in FIG. 24. The endoscope includes of several detectors, a beam splitter, a fiber bundle with multimode fibers surrounding a single mode fiber carrying the excitation light, coupling, focusing and aberration compensation optics including lenses, and an electrowetting lens element for lateral and axial scanning.

Figure 30:
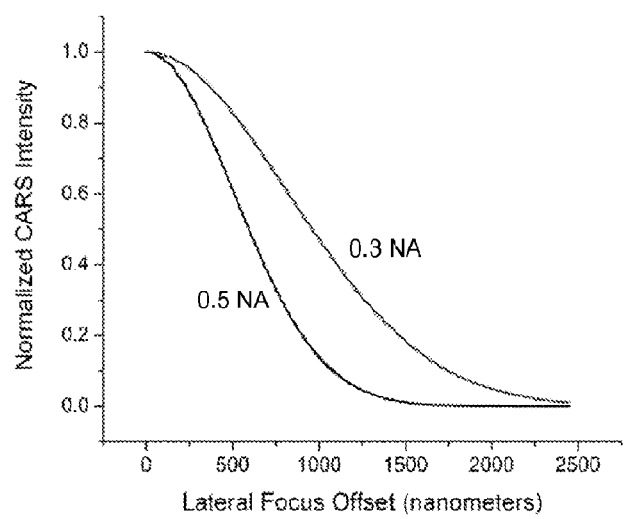
FIGS. 30 and 31 provide theoretical calculations of the dependence of the CARS signal intensity on the offset between the focus of the 816 nm and 1064 nm lasers in both the lateral (left plot) and axial (right plot) directions. Calculations are shown for two different numerical aperture focusing conditions. As expected, for higher numerical apertures, or smaller focus spot sizes, the requirements for overlap of the two beams is greater.
Figure 31:
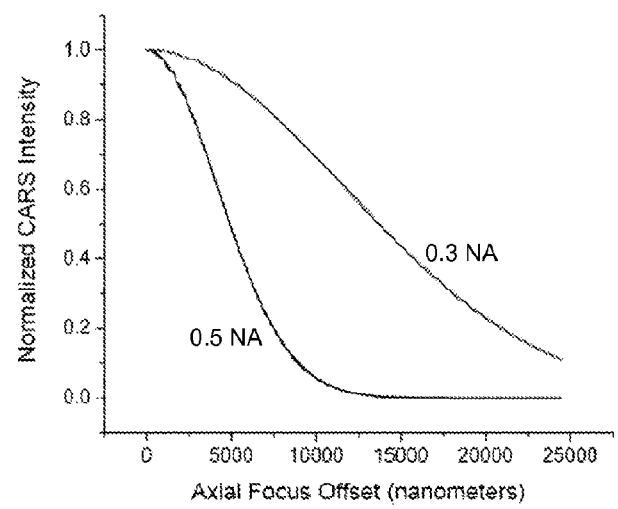

Design considerations for the focusing optical elements in the endoscope should take into account constraints on diameter of the optics as well as requirements for numerical aperture, working distance, and chromatic and geometric aberrations. For CARS imaging, there is the additional and critical design criteria of overlap of the point spread functions (PSF) of the two laser wavelengths. The intensity of the forward CARS signal can be calculated from the following expression: $I_{fCARS} = |\int \chi^{(3)} A(r) c(r) dV|^2$ where $\chi^{(3)}$ is the third-order susceptibility, $c(r)$ is the concentration of the scatterer and $A(r)$ is the product of the Stokes, $E_s(r)$, and squared pump/probe, $E_p(r)$, field amplitude: $A(r) = E_p^2(r) E_s(r)$. We can model the field amplitude for each laser as a 3-dimensional Gaussian with lateral and axial $e^{-2}$ widths calculated for diffraction limit focusing for NA ~0.3 at the appropriate wavelengths (816 nm for pump/probe and 1064 nm for Stokes). FIGS. 30 and 31 show the results of calculations for the dependence of the CARS signal intensity on the offset of the peaks of the PSFs.

Figure 32:
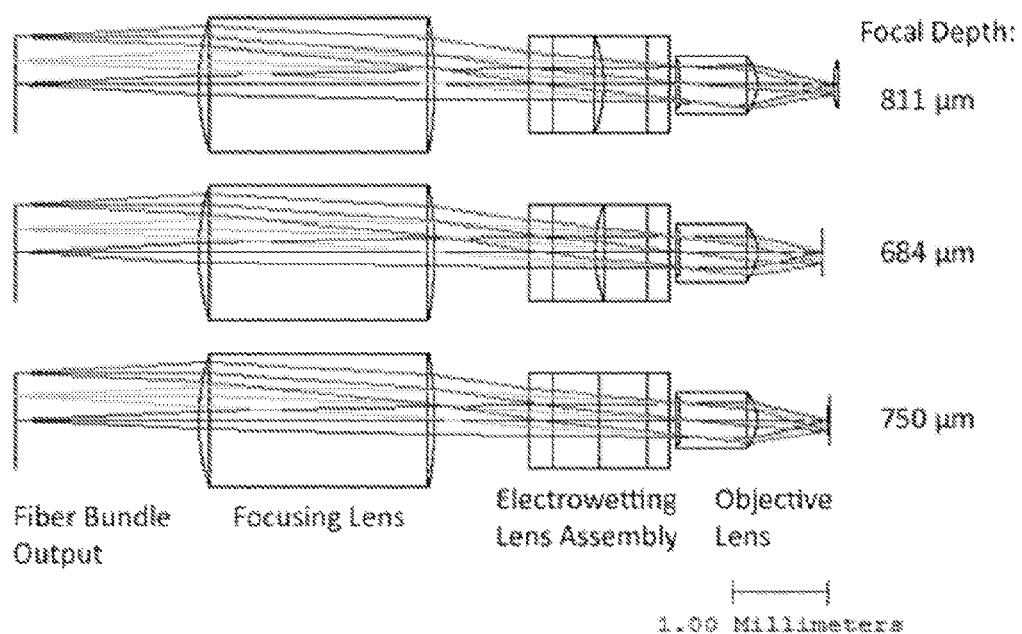
FIG. 32 is a schematic of a Zemax optical design model of miniature imaging lens assembly incorporating an electrowetting lens to change the focal depth for axial scanning. The design consists of a custom focusing lens (Lithotec-CaF2; Schott), electrowetting lens assembly, and an aspheric objective lens (PMMA). The focal depth is scanned over approximately 125 microns with a center working distance of ~750 microns. The lateral scanning range shown is +/−113 microns.
Figure 33:
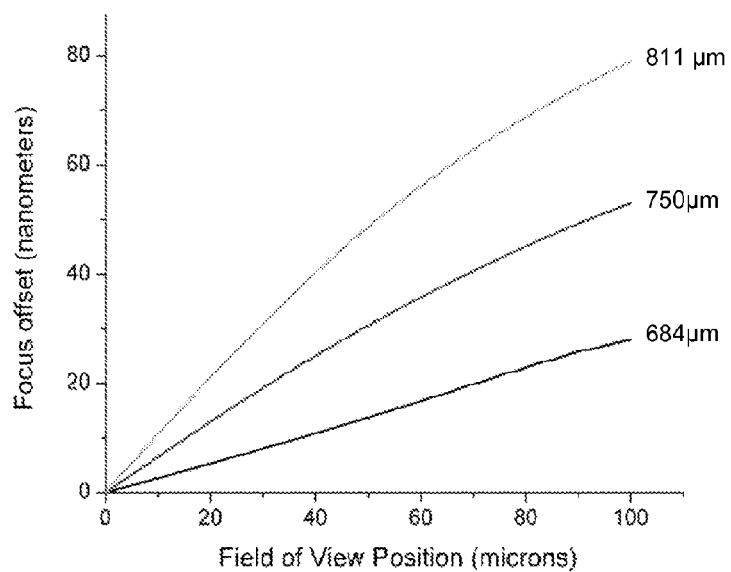
FIG. 33 provides a calculation of lateral focus offset for the two wavelengths (816 nm and 1064 nm) due to chromatic aberration of the model optical system in Zemax. The largest offset is only ~80 nm for the maximum range in the lateral field of view and focal depth, and therefore chromatic aberrations should not be an issue for CARS endoscopy with this set up. Note: The maximum axial focal offset for the two lasers is 6 microns. This is not an issue for lower NA focus of 0.3, but would decrease the CARS signal at higher NA. An additional dispersive element may be required to correct for axial chromatic aberrations.

We have developed an initial design of the optical imaging system that utilizes microlenses and an electrowetting lens to adjust the focal depth position for axial scanning. The design schematic is shown in FIG. 32 and includes (from left to right) of a glass lens, electrowetting variable focal length lens, and molded plastic aspheric lens. The three plots illustrate the effect of changing the focal length of the electrowetting lens. The preliminary design allows a scan range of ~125 microns in Z, and +/−60 microns XY while maintaining a Strehl ratio >0.924 for both PSFs. The working distance is 750 microns. The current object NA of the design is ~0.2-0.3 with an image-to-object magnification of 0.2. The overlap of the PSFs as a function of scan position is shown in FIG. 33. The chromatic aberration of this design will not affect the CARS signal.

Further optimization of the objective asphere can provide a higher object NA of >0.3. In addition, it is desirable that the image NA is matched to the NA of the fiber, which is tied to the magnification of the system. Moreover, in certain embodiments, the device can include one or more GRIN lenses. A GRIN objective lens can provide for higher object numerical apertures with smaller diameter optics, however, these types of lenses suffer from large chromatic aberrations. The aberrations may be able to be corrected with additional dispersive elements such as holograms.

Figure 33A:
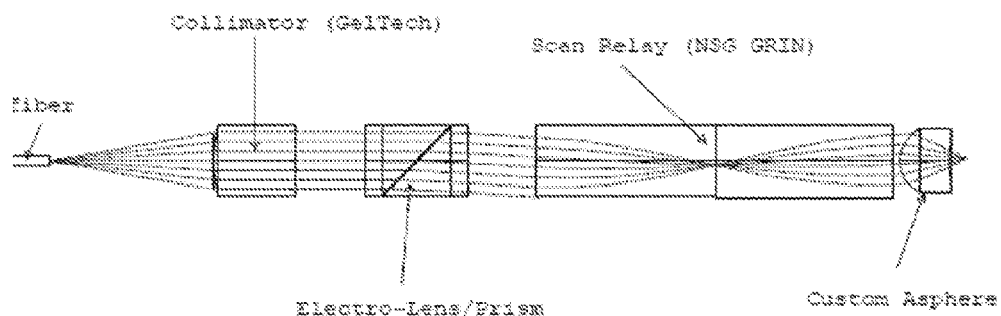
FIG. 33A is a schematic view of a lens assembly according to one embodiment of the disclosure. The assembly includes a fiber, a collimating lens, an electrowetting lens element, a GRIN lens and a custom aspheric lens. The lens assembly can achieve a lateral resolution of 500 nm and an axial resolution of 3.2 microns, and a scan range of +/−35 microns.

Another example of a lens assembly is shown in FIG. 33A.

Figure 34:
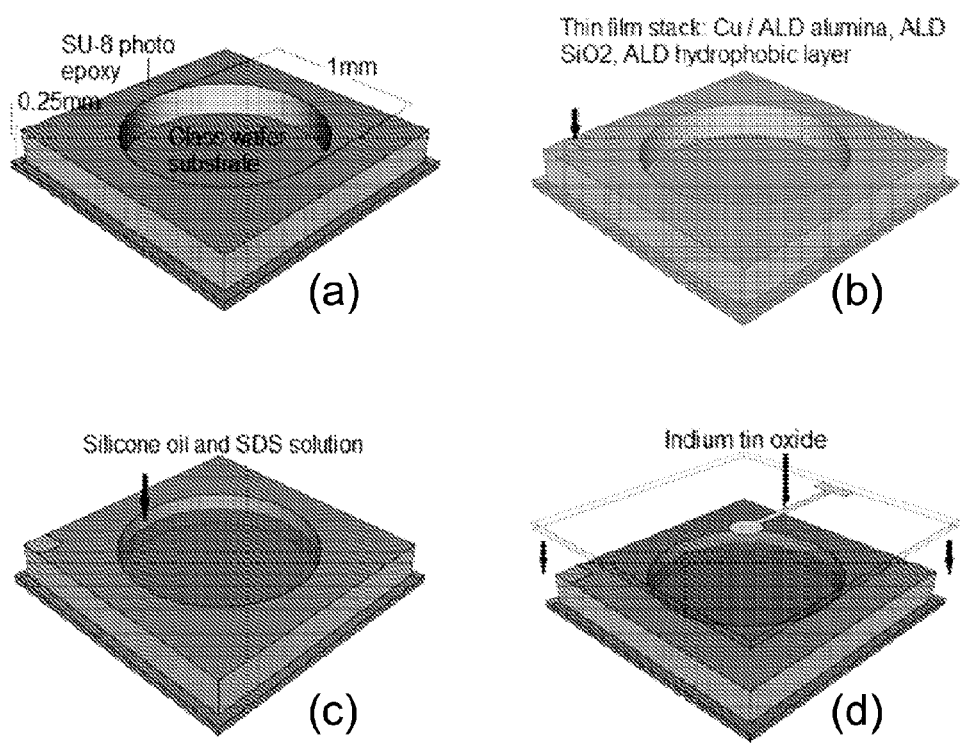
FIG. 34 is a schematic view of a fabrication plan for an electrowetting lens element according to one embodiment of the disclosure. (a) A glass substrate is spin coated with SU-8 and patterned to create the liquid cavity. (b) Copper is sputtered within the cavity and sidewalls. This is followed by ALD alumina and $SiO_2$ that acts as the dielectric layer. Next, the hydrophobic coating is added by ALD. To clear the optical axis, a circular shadow mask allows the anisotropic RIE to etch away the thin films deposited on the bottom of the cavity. (c) The silicone oil and SDS solution are then placed within the cavity. (d) A glass cover slip is coated with ITO, patterned to create an electrode and bonded to the liquid lens assembly.

3.3.2 Electrowetting Lens Fabrication:

The fabrication of individual electrowetting lens elements (also termed lens and prism elements when the focal position can be addressed) can be achieved using standard micro- and nano-fabrication techniques and tools. An overview of one embodiment of a process is in FIG. 34. On a glass wafer substrate, SU-8 is patterned in a 0.5 mm diameter cylindrical cavity for a tunable lens. A copper reference electrode is deposited around the cavity's interior by sputtering. A dielectric layer followed by a hydrophobic layer are used to allow for electrode isolation and focal length tuning. A novel material combination for the dielectric and hydrophobic layers is deposited by ALD. For example, ALD alumina followed by $SiO_2$ are deposited to protect from corrosion for the dielectric layer. The hydrophobic coating will be based on non-chlorinated alkylsilanes. ALD will enable ultra-thin, pinhole free conformal coatings, and produce reliable low voltage (<5V) operation. The contact angle is inversely proportional to dielectric thickness, so a thinner dielectric layer will enable larger changes in contact angle for a given voltage. To keep the optical axis transparent, the thin films deposited on the bottom of the glass substrate are etched away with a directional reactive ion etch (RIE). The cavity is then filled with two immiscible, density-matched liquids, one conductive and one non-conductive, to realize the liquid lens. Here, trimethyl-siloxy-terminated poly(dimethylsiloxane) silicone oil (Gelest DMS-T11) and deionized water with 1% SDS surfactant (Alfa Aesar A11183) to fill our lenses. Finally, a glass cover slide is patterned with a transparent electrode indium tin oxide (ITO) to electrically address the conductive liquid. This cover slide bonded over the cavities with epoxy to complete the device. A cross section of the device can be seen in FIG. 7(a). Further details can be found in R. D. Niederriter, A. M. Watson, R. N. Zahreddine, C. J. Cogswell, R. H. Cormack, M. V. Bright, and J. T. Gopinath, "Electrowetting lenses for compensating phase and curvature distortion in arrayed laser systems," Applied Optics 52, 3172 (2013), which is hereby incorporated herein by reference in its entirety.

3.3.3 Combination Lens-Prism Element Fabrication:

Another intriguing aspect of agile liquid based optical components is the potential for simultaneously controlling focus and beam direction. This could be achieved by having several points of contact along the cavity interior as illustrated in FIGS. 6 and 7. Greater control over the droplet's surface can enable coinciding focus and tip-tilt scanning. The copper thin film can be patterned into multiple leads using shadow masking and RIE. ALD thin films can be deposited on top of the copper, this time allowing electrical contact to each lead from the top of the cavity. To facilitate etching, the sidewall slant angle can be tailored by using back side exposure with thick SU-8.

One particular distinguishing feature of certain devices and methods described herein is the use of ALD ultrathin film coatings as the dielectric and hydrophobic layers within the device. Not only does the ALD thinness reduce the necessary voltage requirement, it also helps prevent water permeation through the polymer cavity by three orders of magnitude, enabling the use of a polymer structural layer for long term devices. Since the polymer is photo-definable, cylindrical cavities can be used for finer lens quality and rectangular cavities for beam steering capability. The sidewalls can be tapered to create nearly vertical sidewalls increasing the variable focus range when compared to typical devices made in silicon, which are restricted by the constraints imposed by a KOH wet etch. With a polymer structural layer, there can be more control over customization when making the device, allowing further optimization of the design by varying parameters like cavity shape, size and thickness as well as sidewall taper. Based on the disclosure herein, and on previous work in the field (e.g., R. D. Niederriter, A. M. Watson, R. N. Zahreddine, C. J. Cogswell, R. H. Cormack, M. V. Bright, and J. T. Gopinath, "Electrowetting lenses for compensating phase and curvature distortion in arrayed laser systems," Applied Optics 52, 3172 (2013); R. Niederriter, J. T. Gopinath, and M. E. Siemens, "Measurement of the M2 beam propagation factor using a focus-tunable liquid lens," Applied Optics 52, 1591-1598 (2013); J. T. Gopinath, M. V. Bright, C. C. Cogswell, R. D. Niederriter, A. M. Watson, R. Zahreddine, and R. H. Cormack, "Simulation of electrowetting lens and prism arrays for wavefront compensation," Applied Optics 51, 6618-6623 (2012), each of which is hereby incorporated herein by reference in its entirety), the person of skill in the art will be able to execute these tasks.

We claim:

1. A method for imaging tissue, the method comprising providing an optical imaging device, the optical imaging device comprising
   one or more sources of optical radiation, the one or more sources of optical radiation providing optical radiation of a first wavelength and optical radiation of a second wavelength different from the first wavelength;
   a flexible lightguide having a first end and a second end, the one or more sources of optical radiation being optically coupled to the first end of the flexible lightguide;
   a lens assembly attached to and optically coupled to the second end of the flexible lightguide, the lens assembly comprising an electrowetting variable-focus lens element, the electrowetting variable-focus lens element having a tunable focal length; and
   a photodetector coupled to the flexible lightguide to detect radiation propagating from the second end toward the first end of the flexible lightguide;
in a first measurement step,
   transmitting optical radiation of the first wavelength and optical radiation of the second wavelength from one or more of the optical sources through the fiber bundle the flexible lightguide and through the lens assembly, thereby focusing the optical radiation of the first wavelength and the optical radiation of the second wavelength in the tissue, wherein the optical radiation of the first wavelength modulates the tissue, and wherein the optical radiation of the second wavelength causes radiation to emanate from the tissue; and
   transmitting the radiation emanating from the tissue to the photodetector through the lens assembly and the flexible lightguide; and then
changing the focal length of the variable-focus lens element and then
in a second measurement step,
   transmitting optical radiation of the first wavelength and optical radiation of the second wavelength from one or more of the optical sources through one or more optical fibers of the fiber bundle and through the lens assembly, thereby focusing the optical radiation of the first wavelength and the optical radiation of the second wavelength in the tissue, wherein the optical radiation of the first wavelength modulates the tissue, and wherein the optical radiation of the second wavelength causes radiation to emanate from the tissue; and transmitting the radiation emanating from the tissue to the fiber bundle through the lens assembly.

2. The method according to claim 1, wherein one or more of the sources of optical radiation comprises a continuous wave diode laser coupled to an intensity modulator to provide pulsed radiation;

a phase modulator coupled to the continuous wave diode laser to receive the pulsed radiation and to spectrally broaden the pulsed radiation to form spectrally broadened pulsed radiation, the spectrally broadened pulsed radiation having a temporal pulse width;

a dispersion compensation element coupled to receive the spectrally broadened pulsed radiation from the phase modulator and to narrow the temporal pulse width of the spectrally broadened pulsed radiation to form temporally narrowed pulsed radiation, the temporally narrowed pulsed radiation having a temporal pulse width; and a section of optical fiber coupled to the dispersion compensation element to receive the temporally narrowed pulsed radiation and configured to narrow the temporal pulse width of the temporally narrowed pulsed radiation through nonlinear broadening.

3. The method according to claim 2, wherein the source of radiation further comprises an optical amplifier coupled to the intensity modulator and the phase modulator in a light path between the intensity modulator and the phase modulator to amplify the pulsed radiation.

4. The method according to claim 1, wherein the flexible lightguide comprises a bundle of optical fibers.

5. The method according to claim 1, wherein the lightguide is 2 mm or less in diameter.

6. The method according to claim 1, wherein the focal length of the lens assembly is tunable over a range of at least 10 µm.

7. The method according to claim 1, wherein the electrowetting variable focus lens element comprises:

a transparent substrate having a surface;

one or more sidewalls extending from the surface of the substrate, the one or more sidewalls having surfaces defining a cavity;

a polar liquid disposed within the cavity;

a second liquid disposed within the cavity, the second liquid being immiscible with the polar liquid and having a different index of refraction than the first liquid, the second liquid being substantially electrically insulating, the polar liquid and the second liquid forming two distinct liquid phases within the cavity;

one or more first electrodes disposed on and distributed around the sidewalls of the cavity; and one or more second electrodes electrically isolated from the one or more first electrodes.

8. The method of claim 7, wherein the electrowetting lens element further comprises a transparent cover disposed over one or more sidewalls, the cover having a surface closing the cavity.

9. The method of claim 7, further comprising one or more voltage sources coupled between the one or more first electrodes disposed on and distributed around the sidewalls of the cavity and the one or more second electrodes.

10. The method according to claim 7, wherein the surfaces of the sidewalls defining the cavity of the electrowetting lens element have one or more coatings formed thereon, and wherein the outermost coating of each is a hydrophobic coating.

11. The method according to claim 7, wherein a single second electrode is provided along the surface of the cover or along the surface of the substrate.

12. The method according to claim 1 configured for bidirectional neural imaging and stimulation, wherein the optical radiation of first wavelength modulates neural activity, and the optical radiation of the second wavelength provides a measurement of neural activity.

13. The method according to claim 1, configured to provide structured illumination to the lens assembly.

14. The method according to claim 1, wherein the flexible lightguide is a bundle of optical fibers, and wherein in the first measurement step, optical radiation of the first wavelength and/or optical radiation of the second wavelength is coupled through one or more first optical fibers of the fiber bundle, and wherein in the second measurement step, optical radiation of the first wavelength and/or optical radiation of the second wavelength is coupled through one or more second optical fibers of the fiber bundle, wherein the one or more second optical fibers of the second measurement step are different than the one or more first optical fibers of the first measurement step, thereby providing lateral scanning.

15. A method for imaging a sample, the method comprising transmitting input optical radiation of a first wavelength and input optical radiation of a second wavelength, the second wavelength being different from the first, from a flexible lightguide through a lens assembly comprising an electrowetting variable-focus lens element, thereby focusing the radiation on or in the sample, the optical radiation of the first wavelength modulating the sample and the optical radiation of the second wavelength causing radiation to emanate from the sample, the electrowetting variable-focus lens element having a tunable focal length and a tunable focal position in a dimension perpendicular to a direction of propagation of radiation through the electrowetting variable-focus lens element, the electrowetting variable-focus lens element comprising:

a transparent substrate having a surface;

one or more sidewalls extending from the surface of the substrate, the one or more sidewalls having surfaces defining a cavity;

a polar liquid disposed within the cavity;

a second liquid disposed within the cavity, the second liquid being immiscible with the polar liquid and having a different index of refraction than the first liquid, the second liquid being electrically insulating, the polar liquid and the second liquid forming two distinct liquid phases within the cavity;

a plurality of separately-addressable first electrodes disposed on and distributed the sidewalls of the cavity in a lateral relationship to one another; and one or more second electrodes electrically isolated from the plurality of separately-addressable first electrodes, the plurality of separately-addressable electrodes being configured such that the focal length of the electrowetting variable-focus lens element and the focal position of the electrowetting variable-focus lens element in a dimension perpendicular to a direction of propagation of radiation through the electrowetting variable-focus lens element can be changed by changing one or more voltage biases on one or more of the plurality of separately-addressable first electrodes;

transmitting the radiation emanating from the sample to the flexible lightguide through the lens assembly; and transmitting the emanated radiation to a photodetector; then changing the focal length of the variable-focus lens element, the focal position of the variable-focus lens element, or both by changing one or more voltage biases on one or more of the plurality of separately-addressable first electrodes, and then repeating the transmitting of the optical radiation from the flexible lightguide through the lens assembly, the transmitting of the radiation emanating from the sample, and the transmitting of the emanated radiation to the photodetector.

16. A method for imaging brain tissue, the method comprising providing an optical imaging device, the optical imaging device comprising one or more sources of optical radiation, the one or more sources of optical radiation providing optical radiation of a first wavelength and optical radiation of a second wavelength different from the first wavelength;

a flexible lightguide having a first end and a second end, the one or more sources of optical radiation being optically coupled to the first end of the flexible lightguide;

a lens assembly attached to and optically coupled to the second end of the flexible lightguide, the lens assembly comprising an electrowetting variable-focus lens element, the electrowetting variable-focus lens element having a tunable focal length; and a photodetector coupled to the flexible lightguide to detect radiation propagating from the second end toward the first end of the flexible lightguide;

transmitting optical radiation of the first wavelength and optical radiation of the second wavelength from one or more of the optical sources through the flexible lightguide and through the lens assembly, thereby focusing the optical radiation of the first wavelength and the optical radiation of the second wavelength in the brain tissue, wherein the optical radiation of the first wavelength excites neurons of the brain tissue, and wherein the optical radiation of the second wavelength causes a Ca' fluorescent marker in the brain tissue to provide fluorescent radiation, which emanates from the brain tissue;

transmitting the fluorescent radiation emanating from the brain tissue to the flexible lightguide through the lens assembly; and transmitting the emanated fluorescent radiation through the flexible lightguide to a photodetector; then changing the focal length of the variable-focus lens element; and then repeating the transmitting of the optical radiation from the flexible lightguide through the lens assembly, the transmitting of the radiation emanating from the sample in response to the optical radiation, and the transmitting of the emanated radiation to the photodetector.

17. A method for imaging tissue, the method comprising providing an optical imaging device comprising one or more sources of optical radiation;

a flexible lightguide having a first end and a second end, the one or more sources of optical radiation being optically coupled to the first end of the flexible lightguide;

a lens assembly attached to and optically coupled to the second end of the flexible lightguide, the lens assembly comprising an electrowetting variable-focus lens element, the electrowetting variable-focus lens element having a tunable focal length; and a photodetector coupled to the flexible lightguide to detect radiation propagating from the second end toward the first end of the flexible lightguide, wherein the flexible lightguide is a bundle of optical fibers, and wherein the device is configured to couple optical radiation of the first wavelength and/or optical radiation of the second wavelength through different optical fibers of the fiber bundle to provide lateral scanning;

in a first measurement step, transmitting optical radiation from the one or more optical sources through one or more optical fibers of the fiber bundle and through the lens assembly, thereby focusing the optical radiation in the tissue; and transmitting radiation emanating from the tissue to the fiber bundle through the lens assembly; and then in a second measurement step, transmitting optical radiation from the one or more optical sources through one or more optical fibers of the fiber bundle and through the lens assembly, thereby focusing the optical radiation in the tissue, the one or more optical fibers of the second measurement step being different than the one or more optical fibers of the first measurement step; and transmitting the radiation emanating from the tissue to the fiber bundle through the lens assembly.

18. The method of claim 17, wherein in the second measurement step, the focal length of the variable-focus lens element is different than in the first measurement step.

19. The method of claim 17, further comprising a third measurement step, performed before or after the second measurement step, the third measurement step comprising:

transmitting optical radiation from the one or more optical sources through one or more optical fibers of the fiber bundle and through the lens assembly, thereby focusing the optical radiation in the tissue, the focal length of the variable-focus lens element being different than in the first measurement step; and transmitting the radiation emanating from the tissue to the fiber bundle through the lens assembly.

* * * * *